United States Patent
Kodera et al.

(10) Patent No.: US 9,956,723 B2
(45) Date of Patent: May 1, 2018

(54) METHOD FOR SEALING A JOINT

(71) Applicant: TOLI Corporation, Itami-shi, Hyogo (JP)

(72) Inventors: Atsushi Kodera, Itami (JP); Shinichi Kotani, Itami (JP); Hidenori Wada, Itami (JP); Kazuki Yoshikawa, Sakai (JP); Masaaki Inuma, Higashiosaka (JP)

(73) Assignee: TOLI CORPORATION, Itami-Shi, Hyogo (JP)

(*) Notice: Subject to any disclaimer, the term of this patent is extended or adjusted under 35 U.S.C. 154(b) by 64 days.

(21) Appl. No.: 15/297,184

(22) Filed: Oct. 19, 2016

(65) Prior Publication Data

US 2017/0157840 A1    Jun. 8, 2017

(30) Foreign Application Priority Data

Oct. 20, 2015 (JP) ................. 2015-206808
Oct. 20, 2015 (JP) ................. 2015-206809
Oct. 20, 2015 (JP) ................. 2015-206810
Feb. 21, 2016 (JP) ................. 2016-30527

(51) Int. Cl.
| | |
|---|---|
| *B29C 65/50* | (2006.01) |
| *B29C 35/08* | (2006.01) |
| *B29C 65/54* | (2006.01) |
| *B29C 65/48* | (2006.01) |
| *B29C 65/00* | (2006.01) |
| *F16J 15/14* | (2006.01) |
| *E04F 15/02* | (2006.01) |
| *E04F 21/165* | (2006.01) |
| *B29K 27/06* | (2006.01) |
| *B29L 31/00* | (2006.01) |

(52) U.S. Cl.
CPC ...... *B29C 65/5042* (2013.01); *B29C 35/0805* (2013.01); *B29C 65/48* (2013.01); *B29C 65/4815* (2013.01); *B29C 65/5028* (2013.01); *B29C 65/542* (2013.01); *B29C 66/1142* (2013.01); *E04F 15/02016* (2013.01); *E04F 21/1652* (2013.01); *F16J 15/14* (2013.01); *B29C 2035/0827* (2013.01); *B29K 2027/06* (2013.01); *B29L 2031/732* (2013.01)

(58) Field of Classification Search
CPC ..................... B29C 65/5042; B29C 65/542
USPC ..................................... 156/304.3
See application file for complete search history.

(56) References Cited

U.S. PATENT DOCUMENTS

| | | | |
|---|---|---|---|
| 3,893,777 A * | 7/1975 | Jones ............... | B29C 66/112 264/261 |
| 8,709,196 B2 * | 4/2014 | Matsuo ............ | B29C 65/1435 156/304.6 |
| 2009/0286035 A1 * | 11/2009 | Matsuo ............ | B29C 65/1635 428/61 |

FOREIGN PATENT DOCUMENTS

| | | | | |
|---|---|---|---|---|
| JP | 61139491 A | * | 6/1986 | ......... B41N 3/00 |
| JP | 2013033277 A | * | 2/2013 | ......... B29C 65/5042 |

* cited by examiner

*Primary Examiner* — Mark A Osele
(74) *Attorney, Agent, or Firm* — K&L Gates LLP

(57) ABSTRACT

Provided is a joint treatment method that enables smooth joint treatment without damaging the ultraviolet radiation curable resin formed on the interior sheet surface. The joint treatment method is for joining a butt joint portion of interior sheets, the protective layer being formed as a surface layer of each of the interior sheets. The method includes: (1) a step of injecting a joint treatment agent, which has no dissolving ability with respect to at least the protective layer, into the butt joint portion; and (2) a step of attaching, before the injected joint treatment agent is cured, an adhesive tape so as to straddle the butt joint portion such that the tape is in contact with the protective layer and the joint treatment agent present in the butt joint portion.

8 Claims, 11 Drawing Sheets

Fig. 8
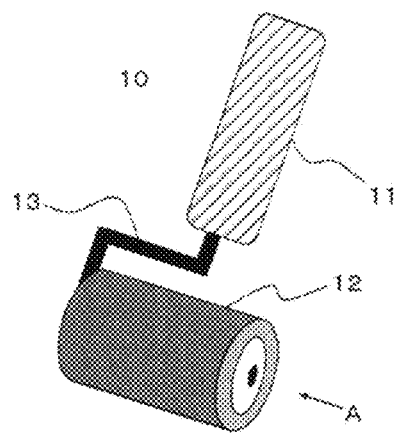
Fig. 9
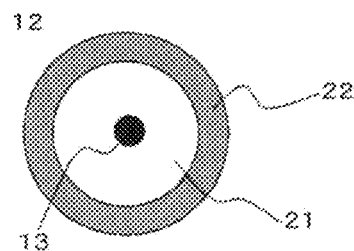
Fig. 10 (a)    Fig. 10 (b)
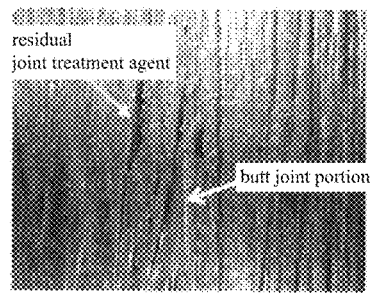 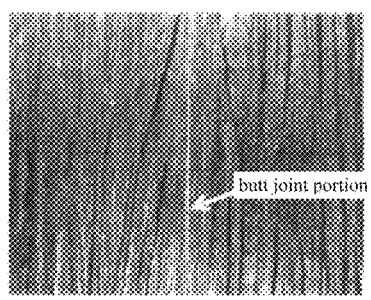
Fig. 11
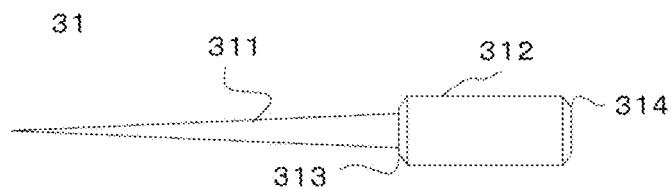

flow channel A flow channel A

Fig. 19 (c)　　　　Fig. 19 (b)
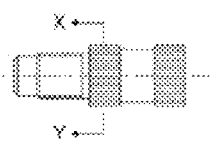
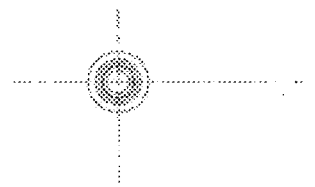
Fig. 19 (a)
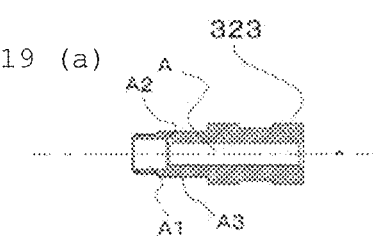
Fig. 20 (b)
Fig. 20 (a)
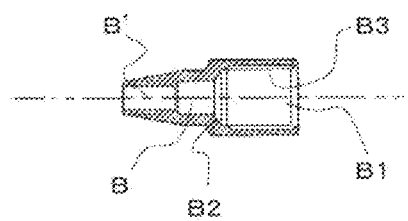
Fig. 21
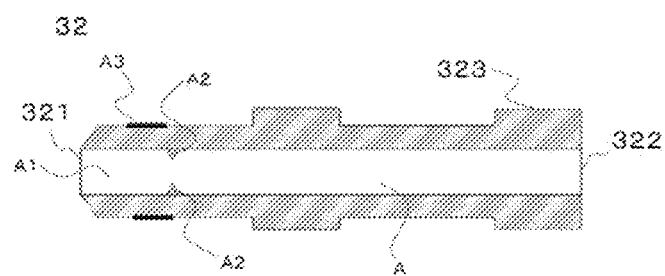

METHOD FOR SEALING A JOINT

BACKGROUND OF THE INVENTION

1. Field of the Invention

The present invention relates to a novel joint treatment method.

2. Description of the Related Art

Where interior sheets such as flooring are laid, there is formed a butt joint portion in which respective edges of the adjoining interior sheets face each other. The butt joint portion is a portion in which the edges of the interior sheets abut against one another or face each other with a very small gap therebetween. Such an abutted portion constitutes an opening through which water would penetrate and then infiltrate into a flooring substrate. To cope with this, treatment for forming a joined portion (referred to hereinbelow as "joint treatment") which plays the role of integrally joining the interior sheets is performed in the butt joint portion.

Various methods have been heretofore suggested for the joint treatment. For example, there is a method in which a butt joint portion of interior sheets is grooved with a cutter or groove cutter, the sheets are welded through a welding rod in the groove, and then the resultant excess material is cut off so as to obtain a finished product with a smooth surface.

Further, a method for installing a flooring material joint is known in which flooring materials are attached to an underlayment with an adhesive interposed, an adhesive tape is attached to the flooring material surface so as to cover the upper part of a joint having a gap of a predetermined width which is formed between the attached flooring materials, an incision is formed along the joint in the adhesive tape, an injection nozzle for injecting a seam sealer is inserted in the incision in the adhesive tape, the seam sealer is injected into the joint with the injection nozzle being moved along the incision in the adhesive tape, and then the adhesive tape is peeled off (Japanese Patent No. 3388960).

Meanwhile, there are interior sheets available in which a protective layer made up of an ionizing radiation curable resin, such as an ultraviolet radiation curable resin, is formed on the interior sheet so as to protect the surface thereof (floor surface, or the like) (Japanese Patent Application Publication Nos. 2002-105874 and 2014-84685). When conducting construction using such interior sheets having a protective layer on the surface thereof, joint treatment is also performed using a seam sealer.

SUMMARY OF THE INVENTION

In this regard, there are seam sealers that are prepared so as to actively dissolve part of the interior sheets, for the purpose of achieving strong joining force upon completion of the joint treatment. When such seam sealer adheres to the protective layer surface, the liquid may damage the protective layer by dissolving same. As a result, not only the function of the protective layer deteriorates, but also the external appearance thereof is degraded.

Meanwhile, when intending to perform the construction such that the seam sealer is utterly prevented from adhering to the protective layer surface, the operation involves much labor and consumes considerable time, resulting in process delay and increased cost.

Therefore, a process is needed which enables efficient joint treatment with the least possible damage to the surface of the interior sheets, but such a process has not yet been suggested.

Under these circumstances, it is a main objective of the present invention to provide a method, according to which it is possible to perform efficient joint treatment while reducing or preventing damage to a protective layer of an interior sheet surface.

Based on the outcome of comprehensive studies aimed at the resolution of the problems inherent to the related art, the inventors have found that the abovementioned objective can be attained by employing a process including specific steps. This finding led to the creation of the present invention.

Thus, the present invention relates to the following joint treatment method.

1. A method for sealing a butt joint portion between interior sheets which have a protective layer comprising an ionizing radiation curable resin, the protective layer being an upper surface layer of each of the interior sheets, the method comprising:

(1) a step of injecting a joint treatment agent, which has substantially no dissolving ability with respect to at least the protective layer, into the butt joint portion; and (2) a step of attaching, before the injected joint treatment agent is cured, an adhesive tape so as to being in contact with the protective layer and the joint treatment agent present in the butt joint portion with covering the butt joint portion.

2. The method according to above 1, further comprising a step of pressing the adhesive tape from above simultaneously with the attachment of the adhesive tape and/or after the attachment thereof.

3. The method according to above 2, further comprising a step of tearing off the adhesive tape after the injected joint treatment agent has been cured.

4. The method according to above 2 or 3, wherein the adhesive tape is a laminate including a base material layer and an adhesive layer formed on either outermost surface of the base material layer, the base material layer being composed of a porous fibrous material.

5. The method according to above 1, wherein (1) the joint treatment agent is a liquid composition comprising a vinyl chloride-based resin and an organic solvent;

(2) the vinyl chloride-based resin is dissolved in the organic solvent; and (3) the organic solvent contains a ketone-type solvent and an alcohol-type solvent.

6. The method according to above 1, wherein the injection of the joint treatment agent into the butt joint portion is carried out using a nozzle member;

(1) the nozzle member comprises a needle component, a nozzle body component and a nozzle tip component, which are detachably connected to each other;

(2) the needle component is disposed at a distal end of the nozzle member and has a needle-shaped body and a support portion for fixing the needle-shaped body;

(3) the nozzle body component has (3a) a flow channel A passing through in a longitudinal direction thereof;

(3b) in the flow channel A, a region A1 where the support portion can be fixed at least in a direction perpendicular to the longitudinal direction by inserting the entire support portion or part thereof into the flow channel A; and (3c) a connection portion A3 for connecting to the nozzle tip component;

(4) the nozzle tip component has (4a) a flow channel B passing through in a longitudinal direction thereof and (4b) a connection portion B3 for connecting to the nozzle body component; and (5) the connection portion A3 and the connection portion B3 are connected such that the flow channel A and the flow channel B form a single flow channel, while the needle-shaped body passes through the flow channel B of the nozzle tip component and protrudes from an opening on a distal end side of the nozzle tip component, and the opening and the needle-shaped body have a gap therebetween in a cross-sectional direction.

7. The method according to above 2, wherein in the step of pressing, the uncured joint treatment agent is pressed through the adhesive tape using a pressing instrument, the pressing instrument comprising (1) (a) a gripping portion; (b) a support portion connected to the gripping portion; and (c) a rotatable roller component mounted on the support portion, (2) the roller component including a core composed of a hard material and an elastic layer laminated adjacently to an outer circumference of the core, and the elastic layer being

ADVANTAGES OF THE INVENTION

According to the present invention, it is possible to provide a method for performing efficient joint treatment while reducing or preventing damage to a protective layer of an interior sheet surface (upper surface).

In particular, by attaching the adhesive tape to the butt joint portion after the joint treatment agent having no ability to dissolve the protective layer has been injected and before this joint treatment agent is cured, it is possible to remove efficiently the excessive joint treatment agent present on the protective layer by peeling the adhesive tape in subsequent process. Thus, since the joint treatment agent is allowed to overflow somewhat from the butt joint portion to the protective layer surface in the step of injecting the joint treatment agent, the injection step can be quickly completed. The result of the above-described features combined is that the joint treatment can be efficiently realized and function inherent to the protective layer can be effectively exhibited.

In addition, in the present invention, since the adhesive tape is attached before the joint treatment agent becomes cured, the adhesion of dust, dirt, sand or the like to the joint treatment agent can be prevented, and the product can be immediately used without waiting for the joint treatment agent to cure. For example, in the case where construction is conducted using flooring materials as interior sheets, since the adhesive tape is stuck to the flooring material surface, no significant problem is created even when a person steps on the flooring material.

The method of the present invention having such features is advantageous for installing interior sheets (in particular flooring material sheets) in sites including houses, commercial facilities, medical facilities, indoor passages, external corridors, verandas, and balconies.

BRIEF DESCRIPTION OF THE DRAWINGS

FIG. 8 shows an embodiment of the pressing instrument for joint treatment of the present invention;

FIG. 9 is a view of the roller taken from the direction A in FIG. 8;

FIG. 10(a) and FIG. 10(b) show results obtained in observing the flooring material surface after the adhesive tape has been peeled off in Example 1 and Comparative Example 1, where FIG. 10(a) and FIG. 10(b) illustrate Comparative Example 1 and Example 1, respectively;

FIG. 11 shows the needle component of the nozzle member of the present invention;

FIG. 14(a) illustrates the case where the support portion has a substantially plate-like cross section, FIG. 14(b) illustrates the case where the support portion has a substantially cross-like cross section, and FIG. 14(c) illustrates the case where the support portion has a substantially triangular cross section;

FIG. 15(a) illustrates a substantially plate-like shape same as that in FIG. 14(c), FIG. 15(b) illustrates a triangular shape in which all sides are curved inward, and FIG. 15(c) illustrates a triangular shape in which all sides are curved outward;

FIG. 17(a) is a cross-sectional view, and FIG. 17(b) is an external appearance view;

FIG. 18(a) is an external appearance view where the nozzle member is viewed from the side surface, and FIG. 18(b) is an external appearance view in which the nozzle member is viewed from the bottom surface of the support portion;

FIG. 19(a), FIG. 19(b), and FIG. 19(c) show the nozzle body component of the nozzle member fabricated in Example 3-1, where FIG. 19(a) is a cross-sectional view of the nozzle body component taken from the side surface, FIG. 19(b) is an external appearance view of the nozzle body portion taken from the side surface, and FIG. 19(c) is an external appearance view of the nozzle body component taken from the distal end side;

FIG. 20(a) and FIG. 20(b) illustrate the nozzle tip component of the nozzle member fabricated in Example 3-1, where FIG. 20(b) is an external appearance view of the nozzle tip component taken from the side surface, and FIG. 20(a) is a cross-sectional view of the nozzle tip component taken from the side surface;

FIG. 21 is a cross-sectional view illustrating an example of the case where a stopper portion A2 is formed in the nozzle body component;

FIG. 25(a) is an external appearance view of the nozzle member taken from the side surface, and FIG. 25(b) is an external appearance view of the nozzle member taken from the bottom surface of the support portion.

DESCRIPTION OF THE PREFERRED EMBODIMENTS

Figure 1:
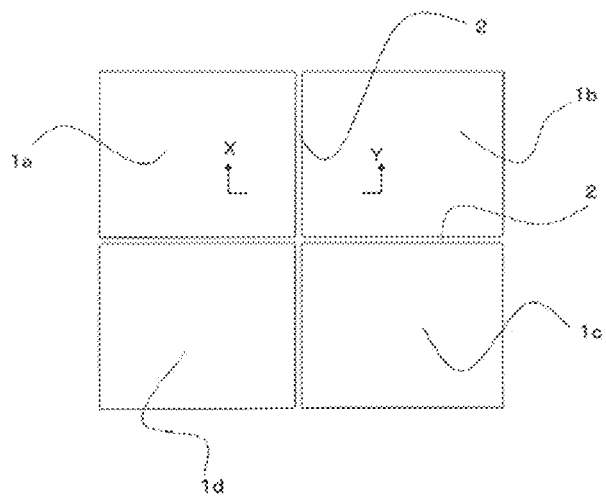
FIG. 1 is a plan view of a plurality of interior sheets (flooring materials) which are laid so as to have a butt joint portion.

The joint treatment method of the present invention (method of the present invention) is directed to a method for sealing a butt joint portion between interior sheets which have a protective layer comprising an ionizing radiation curable resin, the protective layer being formed as a surface layer of each of the interior sheets, the method comprising:

(1) a step of injecting a joint treatment agent, which has substantially no dissolving ability with respect to at least the protective layer, into the butt joint portion (injection step); and (2) a step of attaching, before the injected joint treatment agent is cured, an adhesive tape so as to being in contact with the protective layer and the joint treatment agent present in the butt joint portion with straddling across the butt joint portion (adhesive tape attachment step).

Interior Sheet

The application of the interior sheets or the location where the interior sheets are used is not particularly limited, examples thereof including various materials such as flooring materials and wall materials, but the present invention is particularly applicable to flooring materials. That is, the joint treatment agent can be advantageously used in treatment for filling butt joint portions where a plurality of flooring materials (in particular, sheet-shaped flooring materials) abut against each other. Therefore, the method of the present invention can be advantageously used for joint treatment of vinyl chloride flooring tiles, such as composition vinyl chloride flooring tiles and multilayer vinyl chloride flooring tiles as a flooring material mainly composed of a vinyl chloride-based resin.

The interior sheet used in the present invention can be any of sheets mainly composed of various synthetic resins, such as a vinyl chloride-based resin and a polyolefin-based resin. In the present invention a sheet mainly composed of a vinyl chloride-based resin can be used particularly advantageously.

In the present invention, the expression "mainly composed of a vinyl chloride-based resin" means that: 1) when the interior sheet comprises a monolayer structure of a sheet main body (substrate layer), the sheet main body is composed of a vinyl chloride-based resin; and 2) when the interior sheet comprises a multilayer structure of the sheet main body and another single layer or a plurality of other layers, at least the sheet main body is composed of a vinyl chloride-based resin. In particular, where the interior sheet is configured of a multilayer structure it is desirable that 50% or more, in particular 80% or more, of the thickness thereof be occupied by a layer configured on a vinyl chloride-based resin. Thus, in such a case, 50% or more, in particular 80% or more, of the area of the surface where the interior sheets are in contact with each other is configured of a vinyl chloride-based resin. In this manner, the joint treatment can be performed more advantageously.

When the interior sheet has a multilayer structure, a laminated body can be used, for example, in which at least one layer such as a decorative layer, a reinforcing layer and a surface protecting layer is formed on the sheet main body comprising a vinyl chloride-based resin.

In particular, in the present invention, a protective layer including an ionizing radiation curable resin is formed on the sheet surface. The ionizing radiation curable resin corresponds to a resin that is crosslinked and cured by irradiation with charged particle beams or electromagnetic waves that have energy quants sufficient for crosslinking and polymerizing the monomers, that is, by irradiation with an electron beam, ultraviolet radiation or the like. The ionizing radiation curable resin is, for example, a resin in which curable monomers or oligomers are cured by ionizing radiation.

The curable monomers or oligomers are not particularly limited, provided they can be cured by ionizing radiation. Monomers (monofunctional monomers and polyfunctional monomers such as bifunctional monomers, trifunctional monomers, etc.) that can demonstrate properties such as hardness, gloss, stain resistance required for the protective layer, and also have properties that make them suitable for coating, can be used individually or in combinations of two or more thereof as the curable monomers. Oligomers that can demonstrate properties such as hardness, gloss, stain resistance required for the protective layer, and also have properties that make them suitable for coating, can be used as the curable oligomers. More specifically, bisphenol-A-type, novolac-type, and polybutadiene-type epoxy (meth)acrylates and polyether-type urethane (meth)acrylates can be used individually or in combinations of two or more thereof.

For example, monomers or oligomers having a polymerizable unsaturated bond group such as a (meth)acrylate group and a (meth)acryloyloxy group, or an epoxy group in a molecule can be used as the curable monomer or oligomer.

Specific examples of the curable monomers include styrene type monomers such as α-methyl styrene, methyl (meth)acrylate, 2-ethylhexyl (meth)acrylate, dipentaerythritol hexa(meth)acrylate, dipentaerythritol penta(meth)acrylate, urethane (meth)acrylates, and polyol compounds having two or more thiol groups in a molecule. Specific examples of curable oligomers include monofunctional (meth)acrylates or polyfunctional (meth)acrylates having a polymerizable unsaturated bond, such as urethane (meth)acrylates, polyester (meth)acrylates, epoxy (meth)acrylates, and organic-inorganic hybrid (meth)acrylates obtained by condensation of colloidal silica and (meth)acryloyl alkoxysilane, in addition to unsaturated polyester based oligomer, and epoxy based oligomer.

Among them urethane (meth)acrylates are preferred because a flooring material 1 having suitable flexibility and excellent heat resistance, chemical resistance, and durability can be formed and also excellent adhesion to the sheet main body of flooring material is demonstrated.

The molecular weight of the curable monomer or oligomer is not particularly limited. For example, it can be within a range of 200 to 10,000.

In the present invention, a curable monomer or oligomer that is cured by ultraviolet radiation can be advantageously used because a relatively strong protective layer can be formed and it can be of generic use. In other words, an ultraviolet radiation curable resin can be particularly advantageously used as the ionizing radiation curable resin. The ultraviolet radiation curable resin is not particularly limited, and suitable examples thereof include unsaturated polyesters such as condensates of unsaturated dicarboxylic acids and polyhydric alcohols, methacrylates such as polyester methacrylates, polyether methacrylates, polyol methacrylates, and melamine methacrylates, and acrylates such as polyester acrylates, epoxy acrylates, urethane acrylates, polyether acrylates, polyol acrylates and melamine acrylates.

If necessary, a radical polymerization initiator can be added to the curable monomer or oligomer. The radical polymerization initiator is a compound that generates radicals under irradiation with ionizing radiation. Conventional, well-known hydrogen abstraction-type initiators or cleavage type photoinitiators can be used individually or in combinations of two or more thereof. If necessary, a photosensitizer can be used together with such radical polymerization initiators.

Examples of radical polymerization initiators include 2,2-dimethoxy-2-phenylacetophenone, acetophenone, benzophenone, xanthone, 3-methylacetophenone, 4-chlorobenzophenone, 4,4'-dimethoxybenzophenone, benzoin propyl ether, benzyl dimethyl ketal, N,N,N',N'-tetramethyl-4,4'-diaminobenzophenone, 1-(4-isopropylphenyl)-2-hydroxy-2-methylpropane-1-one, as well as thioxanthone compounds.

A method for forming the protective layer is not particularly limited. For example, the protective layer can be formed by forming a wet coating film by coating a liquid resin composition curable with ionizing radiation and then curing the coating film by irradiation with ionizing radiation.

In addition to the ionizing radiation curable monomer and/or oligomer, which is the main component, the composition may contain additives such as an antistatic agent, a radical polymerization initiator, an ionizing radiation absorber, and an ionizing radiation stabilizer. Further, a solvent may be included within a range in which the effects of the present invention are not impaired.

The thickness of the protective layer is not particularly limited, and is usually 0.005 mm to 0.040 mm. In particular a thickness of 0.010 mm to 0.030 mm is preferred and a thickness of 0.015 mm to 0.025 mm is more preferred.

Injection Step

In the injection step, a joint treatment agent which has substantially no dissolving ability with respect to at least the protective layer is injected in the butt joint portion.

Figure 2:
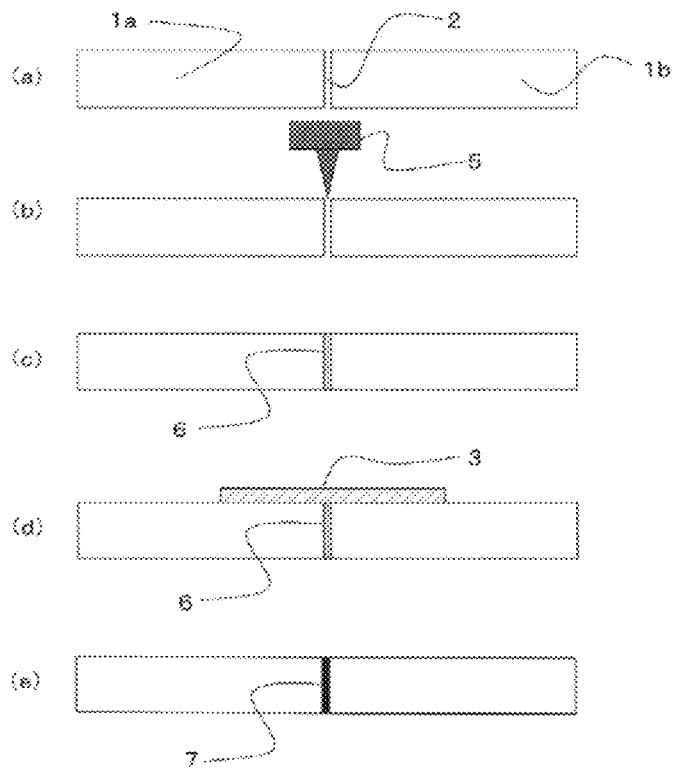
FIG. 2 shows an example of a procedure for filling a butt joint portion with a joint treatment agent, as the first embodiment of the present invention.

One of the specific features of the method of the present invention is that the joint treatment agent is injected in the butt joint portion, without performing masking for preventing the interior sheet surface from contamination. This is because even if the joint treatment agent adheres to the protective layer, it can be easily removed therefrom since an agent which demonstrates substantially no dissolving ability with respect to the protective layer is used as the joint treatment agent. By contrast, in the conventional method, for example, as shown in FIG. 2, it is generally necessary to perform masking with an adhesive tape or the like for preventing the interior sheet surface from contamination, before the joint treatment agent is injected. In the present invention, no masking is needed for preventing the interior sheet surface from contamination.

(a) Joint Treatment Agent

A specific feature of the method of the present invention is the use of a joint treatment agent which has substantially no dissolving ability with respect to the protective layer in order that a masking step of preventing the interior sheet surface from contamination can be omitted as an object of the present invention.

Liquid joint treatment agents can be generally classified, for example, into (1) resin solution type agents in which a resin component is dissolved in an organic solvent; (2) solvent type agents which include no resin component and are composed of one organic solvent or a combination of two or more organic solvents; and (3) emulsion type agents in which a resin component is dispersed in an aqueous medium. Any of such joint treatment agents can be used in the present invention.

In this case, since the aforementioned organic solvents or aqueous solvents (both groups are together referred to as "solvents") demonstrate dissolving ability with respect to the protective layer, then by selecting these solvents with consideration for the relationship with the material of the protective layer, it is possible to employ a joint treatment agent that does not damage the protective layer.

These solvents are not particularly limited and well-known or commercially available solvents can be selected as appropriate. In addition to water, the following solvents can be used: 1) alcohol solvents such as ethanol, methanol, isopropyl alcohol, benzyl alcohol, or the like; 2) ketone-type solvents such as acetone, methyl ethyl ketone, cyclohexanone, methyl isobutyl ketone (MIBK), or the like; 3) ether solvents such as isopropyl ether, methyl cellosolve, ethyl cellosolve, tetrahydrofuran (THF), or the like; 4) ester solvents such as ethyl acetate, methyl acetate, butyl acetate, cellosolve acetate, or the like; and 5) glycol solvents such as ethylene glycol, diethylene glycol or the like. These solvents can be used individually or in combinations of two or more thereof.

In the present invention, by selecting, as appropriate, a solvent which has substantially no dissolving ability with respect to the protective layer formed as a surface layer of the interior sheet resin, it is possible to prepare a joint treatment agent which has substantially no dissolving ability with respect to the protective layer. In the present invention, the expression "has (demonstrates) substantially no dissolving ability with respect to the protective layer" means a property, by virtue of which a decrease in gloss of the surface of the protective layer formed on the interior sheet surface is visually unrecognizable. Therefore, in addition to joint treatment agents which do not dissolve the protective layer at all, the present invention is also inclusive, for example, of joint treatment agents that may slightly dissolve the protective layer surface, but practically no change in the gloss of the protective layer surface can be recognized.

Where a resin component is contained in the joint treatment agent, a vinyl chloride-based resin, a vinyl acetate-based resin, a urethane-based resin, an epoxy-based resin, an acrylic-based resin, etc. can be used as the resin component. These resins can be used individually or in combinations of two or more thereof.

In the present invention, a vinyl chloride-based resin can be particularly advantageously used as the resin component. In addition to a vinyl chloride resin (homopolymer), copolymers including vinyl chloride as a copolymerized component can be used as the vinyl chloride-based resin which is the resin component. Examples of such copolymer include vinyl chloride-vinyl acetate copolymer, vinyl chloride-ethylene copolymer, vinyl chloride-propylene copolymer, vinyl chloride-styrene copolymer, vinyl chloride-isobutylene copolymer, vinyl chloride-vinylidene chloride copolymer, vinyl chloride-butadiene copolymer, vinyl chloride-isoprene copolymer, vinyl chloride-chlorinated propylene copolymer, or the like. These resin components can be used individually or in combinations of two or more thereof. As a result of using a vinyl chloride-based resin as the resin component, compatibility with flooring materials mainly composed of a vinyl chloride-based resin is improved, and effective joint treatment can be performed more reliably.

In the present invention, it is particularly preferred that at least vinyl chloride-vinyl acetate copolymer be used as the vinyl chloride-based resin which is the resin component. By using the vinyl chloride-vinyl acetate copolymer, it is possible to improve solubility in organic solvents and perform the profitable joint treatment more reliably, while minimizing damage to the interior sheet surface. Thus, as a result of improving solubility in organic solvents, it is possible to minimize or reduce to zero the amount used of organic solvents, such as THF, in which vinyl chloride-based resins are easily soluble. As a consequence, damage to the interior sheet surface can be minimized.

The content of vinyl acetate in the vinyl chloride-vinyl acetate copolymer which is the resin component is not particularly limited. It is preferred that the content may be usually 10 mass % to 30 mass %, particularly 12 mass % to 25 mass %, further particularly 13 mass % to 24 mass %. Accordingly, the vinyl chloride-vinyl acetate copolymer having a vinyl acetate content of 15 mass % to 25 mass % can be also used preferably, for example. By setting the amount of vinyl acetate in these ranges, it is possible to increase further the joining strength between the interior sheets, prevent a run-off of the joint treatment agent even when the width of the butt joint portion is increased, and obtain better filling ability.

The content of the resin component in the joint treatment agent can be set, as appropriate, according to the type of the organic solvent used, etc., but this content is generally 20 mass % to 35 mass % and particularly preferably 20 mass % to 30 mass %. As a result of setting such a relatively high concentration, the interior sheets can be joined with a relatively high strength even when the organic solvent does not actively dissolve the interior sheet. Further, where the concentration of the resin component is increased, the viscosity increases. As a result, a run-off does not occur even when the width of the butt joint portion is increased and better filling ability can be obtained. These results contribute to increased efficiency of the joint treatment.

Further, an additive which is used in the well-known or commercially available seam sealers can be added, as necessary, to the joint treatment agent in a range that does not substantially adversely affect the advantages of the present invention. Examples of such additives include stabilizers, antifungal agents, weathering stabilizers, surfactants, dispersants, thickeners, plasticizers, preservatives, rust inhibitors, antibacterial agents, antifreezing agents, antifoaming agents, film forming assistants, matting agents, or the like. A stabilizer can be used for preventing the resin component from discoloration at normal temperature. Examples of suitable stabilizers include metal-type stabilizers containing metal such as lead, barium, zinc, calcium, and tin, and organic stabilizers such as epoxy plasticizers. Examples of weathering stabilizers include ultraviolet absorbers and photostabilizers.

The joint treatment agent is in the form of a liquid composition as a resin solution. The viscosity thereof is not particularly restricted, provided that the agent is flowable at normal temperature, and can be adjusted, as appropriate, according to the portion to be constructed, etc. Where the viscosity of the treatment agent of the present invention is too low, the treatment agent can be easily injected into a gap between interior sheets but tends to also flow out easily onto the surface of the underlayment. Meanwhile, where the viscosity of the joint treatment agent is too high, the agent is unlikely to flow out to the surface of the underlayment, but the joint treatment agent is also difficult to inject into the gap. Therefore, it is preferred that the viscosity of the joint treatment agent be set within a specific range with consideration for balance. For example, when the interior sheet material is a flooring material, or the like, the viscosity at 23° C. is generally 40 mPa·s to 20,000 mPa·s, particularly preferably 50 mPa·s to 10,000 mPa·s, and even more preferably 70 mPa·s to 1100 mPa·s. Therefore, the viscosity can be advantageously set within a range, for example, of 100 mPa·s to 1100 mPa·s, and can be also set, for example, to 70 mPa·s to 300 mPa·s. Here, the viscosity (mPa·s) is a value measured at a temperature of 23° C. under the condition of revolution speed=20 rpm by using a BII Viscometer (manufactured by Toki Sangyo Co., Ltd.; model "BHII").

A TI value of the treatment agent with a low flowability is not particularly limited. The TI value is a ratio of the viscosity under a low shear force to that under a high shear force. Where the TI value is high, then in a state after the joint treatment agent has been injected, the flowability is relatively low and the joint treatment agent is unlikely to flow out to the base surface. Meanwhile, where the TI value is high, then in a state after the injection, the flowability is relatively high and the joint treatment agent tends to flow out easily to the surface of the underlayment. Therefore, it is preferred not to set a very low TI value. Thus, it is preferred that a relatively high TI value be set, but the value needs to be set with consideration for balance with the viscosity value. For example, it is usually preferred that the TI value of the treatment agent be 1.0 or more. The upper limit of the TI value of the treatment agent is not particularly limited, but the practical numeric value is 8.0 or less, preferably 7.0 or less. In the present invention, the TI value is calculated by the following equation.

$$TI \text{ value} = (\text{Viscosity measured at a revolution speed of 6 rpm})/(\text{Viscosity measured at a revolution speed of 60 rpm})$$

The viscosity used for calculating the TI value is measured at a temperature of 23° C. by using a BII Viscometer (manufactured by Toki Sangyo Co., Ltd.; model "BHII").

The joint treatment agent can be prepared by uniformly mixing the components. A well-known device, for example, a mixer or a kneader, can be used for mixing.

<Embodiment of the Joint Treatment Agent Used in the Method of the Present Invention>

As an exemplary embodiment of the joint treatment agent, a joint treatment agent (referred to hereinbelow as the "treatment agent of the present invention") composed of a liquid composition comprising a vinyl chloride-based resin and an organic solvent, the joint treatment agent being characterized by that: (1) the vinyl chloride-based resin is dissolved in the organic solvent; and (2) the organic solvent includes a ketone-type solvent and an alcohol-type solvent can be advantageously used.

The treatment agent of the present invention comprises a ketone-type solvent and an alcohol-type solvent as organic solvents. By using these two organic solvents together, it is possible to reduce or prevent damage to the interior sheet surface by the solvent while effectively dissolving the resin component in the solvent.

The ketone-type solvent is not particularly limited, and suitable examples thereof include acetone, methyl ethyl ketone, diisobutyl ketone, cyclohexanone, methyl isobutyl ketone (MIBK), or the like. Among them, methyl ethyl ketone is preferred due to relatively high volatility and volatility lower than that of alcohols. In this case, as a result of using methyl ethyl ketone together with another ketone-type solvent, it is also possible to control, as appropriate, for example, the curing rate of the treatment agent of the present invention. For example, by using methyl ethyl ketone together with acetone, it is possible to shorten the curing time. Further, for example, as a result of using methyl ethyl ketone together with at least one of cyclohexanone and methyl isobutyl ketone, it is possible to extend the curing time.

A ketone-type solvent with a higher volatility is preferred because drying after the joint treatment is accelerated, but it is more preferred that the volatility of the ketone-type solvent be lower than that of the alcohol-type solvent. Thus, a combination of an alcohol-type solvent and a ketone-type solvent that is higher in volatility than the alcohol-type solvent can be advantageously used. Where the ketone-type solvent has volatilized before the alcohol-type solvent has volatilized during the joint treatment, the resin component which is not soluble in the alcohol-type solvent can remain in a particulate form on the surface of the joined portion. By contrast, where the alcohol-type solvent has volatilized in advance and then the ketone-type solvent has volatilized, the joined portion having a smooth surface can be formed. When comparing the volatilities, the vapor pressure of the solvents at 20° C. is taken as a measure.

The content of the ketone solvent in the treatment agent of the present invention can be set, as appropriate, according to the type of the organic solvent used, etc., but is generally 40 mass % to 60 mass %, and particularly preferably 50 mass % to 60 mass %.

The alcohol-type solvent is not particularly limited, and examples thereof include methanol, ethanol, butanol, isobutanol, isopropyl alcohol, normal propyl alcohol, 1,3-butanediol, 1,4-butanediol, and benzyl alcohol. In particular, at least one of methanol, ethanol, normal propyl alcohol, and isopropyl alcohol is preferred because the volatility is relatively high and the drying rate after the treatment is high. Among them, ethanol or a solvent including ethanol as the main component is most preferred from the standpoint of safety and the like.

The content of the alcohol-type solvent in the treatment agent of the present invention can be set, as appropriate, according to the type of the organic solvent used, etc., but is generally 10 mass % to 30 mass % and particularly preferably 15 mass % to 25 mass %.

Further, the ratio of the ketone-type solvent and alcohol-type solvent in the treatment agent of the present invention is nor particularly restricted, but it is preferred that the amount of the ketone-type solvent be 150 parts by mass to 350 parts by mass per 100 parts by mass of the alcohol-type solvent, and it is more preferred that the amount of the ketone-type solvent be 200 parts by mass to 300 parts by mass leper 100 parts by mass of the alcohol-type solvent. By setting the amounts of solvents within such ranges, it is possible to dissolve the resin component more reliably in the organic solvents.

The treatment agent of the present invention may also include other solvents without adversely affecting the profitable effects of the present invention, but it is desirable that the content of other solvents in the treatment agent of the present invention be 10 mass % or less. In particular, a certain amount of tetrahydrofuran (THF) may be included, but from the standpoint of preventing the interior sheets from damage, it is preferred that the content of the tetrahydrofuran in the treatment agent of the present invention be 5 mass % or less.

It is preferred that the treatment agent of the present invention include a colorant. For example, well-known dyes and pigments, and also toners including a dye or pigment in a resin can be used as the colorants. As a result of including a colorant of the same or similar color as the interior sheets in the treatment agent of the present invention, it is possible to make the joined portion unnoticeable and form a floor structure having an integral external appearance. Further, even where filled amount of the joint treatment agent is insufficient, the treatment agent of the present invention can be easily refilled and the joined portion with satisfactory finish can be formed. In this case, where the joined portion is smoothly formed as a result of selecting as described hereinabove, the combination of volatilities of the alcohol-type solvent and ketone-type solvent, the joined portion can be made even less noticeable and a flooring or the like having a more integral external appearance can be formed.

The treatment agent of the present invention can be obtained by uniformly mixing the components thereof so that the vinyl chloride-based resin is dissolved in the organic solvent. The mixing method is not particularly restricted, provided that the vinyl chloride-based resin is dissolved in the organic solvent, and can be implemented using a well-known device, for example, a mixer or a kneader.

The compounding order of the components is not particularly limited, provided that the vinyl chloride-based resin can be dissolved in the organic solvent. In particular, in the present invention, the treatment agent of the present invention can be advantageously prepared by a production method including: (1) a step of preparing a dispersion by dispersing a vinyl chloride-based resin in an alcohol-type solvent (dispersion step); and (2) a step of obtaining a solution of the vinyl chloride-based resin by mixing the dispersion with a ketone-type solvent (dissolution step).

In the dispersion step, by using an alcohol-type solvent as an organic solvent in which the vinyl chloride-based resin is not dissolved, it is possible to disperse fine particles of the vinyl chloride-based resin in advance to a high degree in the liquid phase in advance. In particular, even if the vinyl chloride-based resin is a fine powder (for example, with a particle size of 500 μm or less), a lump-free dispersion can be prepared by using an alcohol-type solvent. Furthermore, since the vinyl chloride-based resin is dispersed in the alcohol-type solvent in advance, that is, before the dissolution step, the amount of the alcohol-type solvent used can be reduced. As a result, a more efficient dissolution can be realized in the dissolution step.

In the dissolution step, the ketone-type solvent which is an organic solvent for dissolving the vinyl chloride-based resin and the dispersion are mixed together. As a result, individual fine particles of the vinyl chloride-based resin contained in the dispersion are rapidly dissolved in the ketone-type solvent.

Thus, the treatment agent of the present invention can be obtained. In other words, a joint treatment liquid obtained by the production method including: (1) a step of preparing a dispersion by dispersing a vinyl chloride-based resin in an alcohol-type solvent (dispersion step); and (2) a step of obtaining a solution of the vinyl chloride-based resin by mixing the dispersion with a ketone-type solvent (dissolution step), can be advantageously used as the treatment agent of the present invention.

The vinyl chloride-based resin and organic solvents same as described hereinabove can be used in the production method. The amounts thereof to be used also may be the same as explained hereinabove in 1.

When such a joint treatment agent is used, the surface of the interior sheets is unlikely to be damaged and the desired joint treatment can be carried out more effectively.

In particular, as a result for using a ketone-type solvent together with an alcohol-type solvent, it is possible to enhance the dissolution of the vinyl chloride-based resin as a resin component in the solvent. Thus, the alcohol-type solvent practically does not dissolve the vinyl chloride-based resin, but since it is used together with the ketone-type solvent, the dissolution of the vinyl chloride-based resin can be enhanced. As a result, a relatively large amount of the vinyl chloride-based resin can be contained in the treatment agent. In other words, a high content of solids can be realized, and the joint treatment can be thereafter efficiently implemented.

Further, at the same time, since the dissolution power of a mixed solvent of a ketone-type solvent and an alcohol-type solvent with respect to the interior sheets made from a vinyl chloride-based resin is less than that of THF, or the like, even when the joint treatment agent adheres to the surface of the interior sheets, the surface is unlikely to be damaged and the desired joint treatment can be effectively performed.

The joint treatment agent with such specific features can be advantageously used as a seam sealer for injection into a joint which is a portion where interior sheets, which are used as building materials, are brought into contact with each other. In particular, the joint treatment agent can be advantageously used as a seam sealer for joining flooring material sheets (tiles) by filling into a butt joint portion between the flooring material sheets.

(b) Injection Method

A method for injecting the treatment agent of the present invention in the injection step is not particularly limited. For example, the liquid treatment agent of the present invention may be injected in the butt joint portion by using a well-known nozzle member or the like. More specifically, the injection step can be implemented by using a nozzle having a hollow or solid needle-shaped body, inserting the needle-shaped body (needle tip) in the butt joint portion, and supplying the joint treatment agent to this portion, thereby filling this portion with the joint treatment agent.

Adhesive Tape Attachment Step

In the adhesive tape attachment step, before the injected joint treatment agent is cured, an adhesive tape is attached to straddle the butt joint portion so as to be in contact with the joint treatment agent located in the butt joint portion and the protective layer.

In the adhesive tape attachment step, for example, as shown in FIG. 4(a), an adhesive tape 3 may be pasted such as to be in contact with both a joint treatment agent 6 injected in a butt joint portion 2 and protective layers 9a, 9b on the upper surface of two flooring materials (interior sheets). In this case, since the joint treatment agent 6 is a liquid before curing and part thereof overflows from the butt joint portion and covers part of the protective layer surface, the adhesive tape attachment step can be effectively implemented by using the adhesive tape 3 (preferably one piece of adhesive tape) which is wider than the overflow portion.

In the related art, as mentioned hereinabove, an adhesive tape is used for masking before the injection. By contrast, in the method of the present invention, the adhesive tape is used with the object of: (1) protecting the joint treatment agent from contamination during curing; and (2) peeling and removing the cured body of the joint treatment agent in the excessive portion which has protruded from the butt joint portion.

The adhesive tape which is used in the tape attachment step is not particularly limited, provided that it has the desired adhesivity and peelability. As for the layer configuration thereof, an adhesive tape can be advantageously used which is a laminate including a substrate layer and an adhesive layer formed on either outermost surface of the substrate layer, the substrate layer being configured of a porous fibrous material. For example, an adhesive tape can be used that includes a band-like substrate composed of a porous fibrous material and an adhesive layer formed on the back surface of the substrate. A well-known or commercially available adhesive tape can be used as such a tape.

It is preferred that a substrate be used that is solvent resistant and is unlikely to be eroded by the organic solvent contained in the joint treatment agent. Further, the substrate may be transparent, semi-transparent, or opaque.

Examples of such substrates include laminated sheets obtained by laminating a cloth sheet and a polyolefin sheet from polyethylene, polypropylene, etc.; polyolefin sheets from polyethylene, polypropylene, etc.; and paper sheets from cellulose fibers, etc. Further, it is preferred that the substrate be stretchable at least in the lateral direction. An adhesive tape stretchable in the lateral direction elongates in the lateral direction as a result of application of an in-plane force. It is particularly preferred that an adhesive tape stretchable in the lateral direction and longitudinal direction be used. In the present invention, it is particularly preferred that a substrate having high air permeability be used because drying and curing of the joint treatment agent can be promoted. A porous fibrous material such as paper and nonwoven fabric can be used as such a substrate. The air permeability of the substrate is preferably 1 $cc/cm^2 \cdot sec$ to 500 $cc/cm^2 \cdot sec$ and more preferably 2 $cc/cm^2 \cdot sec$ to 300 $cc/cm^2 \cdot sec$. This air permeability is a value measured using a Frazier type air permeability tester manufactured by Toyo Seiki Seisaku-sho, Ltd. according to the air permeability test method stipulated by JIS L 1096.

An adhesive agent for forming the adhesive layer is not particularly limited, but it is preferred that a solvent-resistant adhesive agent be used, in the same manner as in the substrate.

In particular, a pressure-sensitive adhesive agent, etc. that exhibits adhesivity at normal temperature and adheres to an adherend under applied pressure is preferred as the above-mentioned adhesive agent. Examples of materials for the adhesive agent include rubbers and acrylic materials. The adhesive layer can be peeled off from the adherend and repasted, without leaving the adhesive agent on the adherend.

The adhesive force of the adhesive layer is not particularly limited, provided that predetermined re-peelability can be ensured, but an adhesive force of about 0.5 N/10 mm to 10 N/10 mm is preferred and an adhesive force of 1 N/10 mm to 5 N/10 mm is more preferred. As a result of setting the adhesive force in these ranges, it is possible to obtain satisfactory peelability without problems, such as adhesive residues, while maintaining good adhesivity. The adhesive force in the present invention is a value obtained by peel off at an angle of 180 degrees in a test implemented according to JIS Z 0237 "Methods for Testing Adhesive Tapes and Adhesive Sheets".

Further, as mentioned hereinabove, "N/10 mm" is the unit of measurement for the adhesive force in the present invention, but for an adhesive force F1 that is indicated at other test piece widths W, a value F2 is used that is found with the following recalculation Formula (1):

$$F2(\text{N}/10 \text{ mm})=F1\times(10/W) \quad \text{Formula (1)}$$

Pressing Step

In the method of the present invention, a step of pressing the adhesive tape from above may be also implemented, if necessary, at the same time as the adhesive tape attachment step and/or thereafter. As a result of implementing the pressing step, the adhesive tape and joint treatment agent can be brought into contact and bonded more reliably. Therefore, the portion of the cured body of the joint treatment agent which has protruded from the butt joint portion can be removed more effectively in the adhesive tape peeling step.

A method for implementing the pressing step is not particularly restricted. For example, a plate, or the like, may be disposed on the adhesive tape and pressure may be applied thereto from above. The pressing step can be also implemented by simply placing a plate having a specific weight on the adhesive tape.

In the method of the present invention, a step of pressing the adhesive tape from above by using the instrument of the present invention may be implemented at the same time as the adhesive tape attachment step and/or thereafter. As a result of implementing the pressing step, the adhesive tape and joint treatment agent can be brought into contact and bonded more reliably. Therefore, the portion of the cured body of the joint treatment agent which has protruded from the butt joint portion can be removed more effectively in the adhesive tape peeling step.

Figure 7:
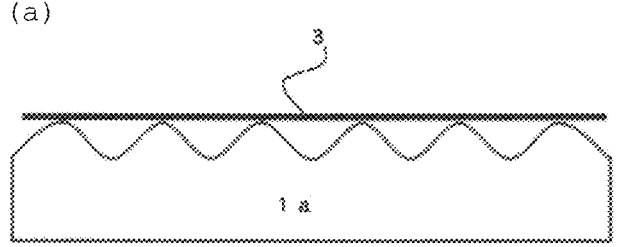
FIG. 7(a) shows a state in which the adhesive tape is attached to the surface of an interior sheet.
FIG. 7(b) shows a state in which the adhesive tape is pressed with an available press-affixing roller.
FIG. 7(c) shows a state in which the adhesive tape is pressed with a pressing instrument for joint treatment of the present invention.
Figure 7:
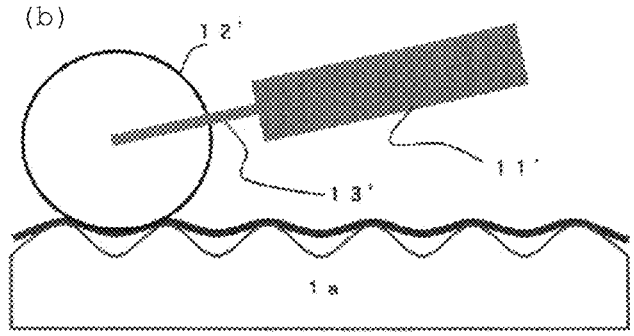
Figure 7:
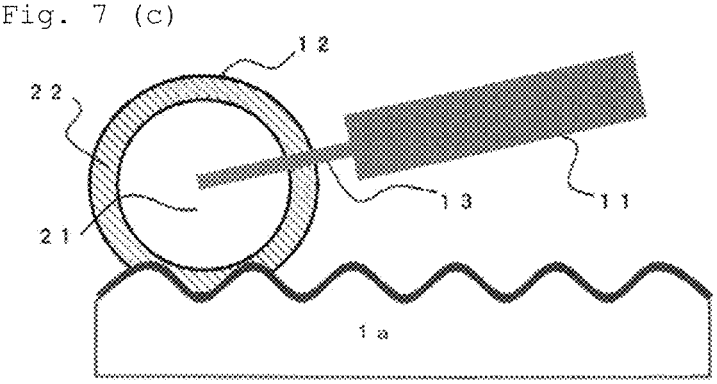

In particular, in this step, since pressing is performed using the instrument of the present invention, as shown in FIG. 7(c), the joint treatment agent can be introduced deeply into the butt joint portion by the pressure created by a core 21 in a roller portion 12 of the instrument of the present invention. At the same time, an adhesive tape 3 is effectively caused, mainly by an elastic layer 22, to follow irregularities formed on the upper surface of an interior sheet 1a, thereby making it possible to remove, with better efficiency, the joint treatment agent after curing.

A method for implementing the pressing step using the instrument of the present invention is not particularly restricted. For example, the instrument of the present invention may be brought into contact, from above, with the adhesive tape and moved reciprocatingly on the adhesive tape such that the roller portion of the instrument of the present invention rotates forward and backward. In particular, as a result of reciprocatingly moving the tool in the longitudinal direction of the adhesive tape, it is possible to complete the pressing step over a relatively short time.

As for the degree of pressing, as shown in FIG. 7(c), it is desirable to ensure complete contact with the joint treatment agent in depressions on the surface of the interior sheet 1a, but the pressing may be implemented such that even when the contact is incomplete, a contact state is ensured such that the joint treatment agent after curing can be substantially completely removed at the very end.

Adhesive Tape Peeling Step

The adhesive tape attached in the adhesive tape attachment step may be peeled off after the joint treatment agent has been cured. As a result of peeling the adhesive tape, it is possible to remove the portion of the cured body of the joint treatment agent which has protruded from the butt joint portion. Thus, it is preferred to implement the step of tearing off the adhesive tape such that after the injected joint treatment agent has been cured, the portion of the cured body of the joint treatment agent (unnecessary portion) that has protruded from the butt joint portion is removed.

<Embodiment of Joint Treatment>

An embodiment of the method of the present invention in the case of performing the joint treatment of flooring materials from a vinyl chloride-based resin as interior sheets will be explained with reference to the drawings.

Arrangement of Flooring Materials

As shown in FIG. 1, a plurality of flooring materials (sheet-shaped flooring materials) 1a to 1d are disposed on an underlayment in a state such that abutting portions at the edges thereof face each other. In FIG. 1, four flooring materials 1a to 1d are shown, but the number of the flooring materials A is not necessarily limited to four and two or more thereof may be used. Further, in FIG. 1, the flooring materials 1a to 1d are formed in a planar square shape, but such shape is not limiting and any shape, for example, a planar rectangular shape, a planar triangular shape, and a planar regular hexagonal shape can be selected. Further, the edges of the plurality of the flooring materials 1a to 1d are formed linearly, but curved edges may be also formed. When curved shaped are joined together, gaps tend to form and joining with the conventional seam sealer is difficult. With the treatment agent of the present invention reliable joining can be performed by filling the gaps. Therefore, the treatment agent of the present invention can be also advantageously used even for joining curved shapes.

A butt joint portion 2 is formed between the edges of the flooring materials 1a to 1d. The butt joint portion 2 is a very small gap formed between abutting end surfaces. Thus, after the first flooring material 1a has been fixed on the underlayment, the second flooring material 1b is laid such that the abutting end surface of the second flooring material 1b is in contact with the abutting end surface of the first flooring material. In this case, the abutting end surfaces are not necessarily in contact along the entire edge, or close contact such that water cannot leak is not ensured in the portion in which the abutting end surface are in contact. Therefore, a small gap such that water or the like can pass therethrough is formed between the abutting end surfaces. This gap is the aforementioned butt joint portion 2. Where the width of the butt joint portion 2 is too large, the butt joint portion can be difficult to join reliably. Therefore, the width of the butt joint portion usually may be 0 mm to 0.5 mm, preferably 0 mm to 0.3 mm.

Where the width of the butt joint portion 2 is 0 mm, the abutting end surfaces are in contact and macroscopically no gap is percent, but microscopically, since very fine protrusions and depressions are present on the abutting end surfaces, intimate contact such that water cannot leak is not ensured in the portion in which the abutting end surface are in contact. Therefore, the butt joint portion 2 needs to be joined.

Procedure of Joint Treatment (First Embodiment)

Figure 6:
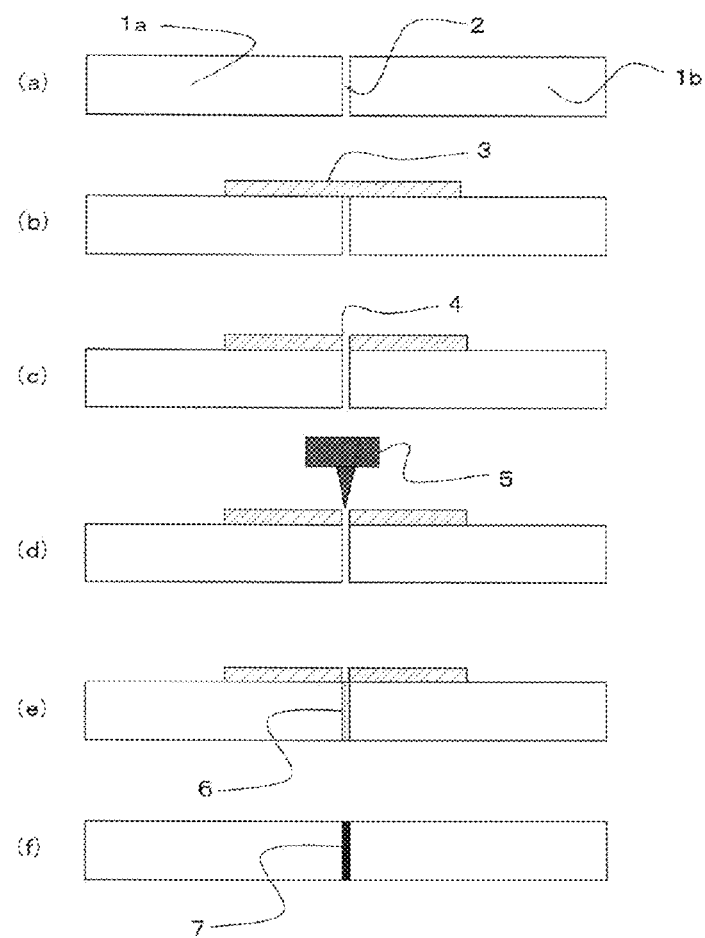
FIG. 6 shows a procedure of a conventional joint treatment method.

FIG. 2 illustrates the first embodiment of the method of the present invention. For comparison, the steps of the conventional joint treatment are shown in FIG. 6. In FIG. 2, the depiction of the protective layer is omitted.

As shown in FIG. 6, according to the conventional method, the following steps are implemented: 1) a step of laying a plurality of flooring materials, while forming butt joint portions, such that the edges of the flooring materials face each other (flooring material laying step); 2) a step of pasting an adhesive tape on the upper surface of the flooring materials so as to cover the butt joint portions (masking tape pasting step); 3) a step of forming an incision line along the butt joint portion in the surface of the adhesive tape and dividing the adhesive tape into a first region and a second region separated by the incision line (incision line formation step); 4) a step of injecting a seam adhesive into the butt joint portion from the incision line (injection step); 5) a step of drying the injected seam adhesive (drying step); and 6) a step of tearing off the adhesive tape from the flooring materials after the joint treatment agent has dried (peeling step).

By contrast with the method of the present invention, as shown in FIG. 2, the following steps are advantageously implemented: 1) a step of laying a plurality of flooring materials such that the edges of the flooring materials (interior sheets) face each other (flooring material laying step); 2) a step of injecting the treatment agent of the present invention into a butt joint portion (injection step); 3) a step of pasting an adhesive tape on the surface of the flooring materials so as to straddle the butt joint portions (adhesive tape attachment step); 4) a step of drying the injected treatment agent of the present invention (drying step); and 5) a step of peeling off the adhesive tape after the treatment agent of the present invention has dried (adhesive tape peeling step). The steps in the first embodiment will be explained hereinbelow by using FIGS. 1 and 2.

1) Flooring Material Laying Step

As explained hereinabove, the flooring materials 1a to 1d are laid, as shown in FIG. 1, on the surface of the underlayment (not shown in the figure). This step corresponds to FIG. 2(a).

When the flooring materials 1a to 1d are laid, the first flooring material 1a is affixed to the underlayment by using an adhesive agent, and the second flooring material 1b is abutted against each other and affixed to the underlayment such that the abutting end surface of the edge of the second flooring material 1b is in contact with the abutting end surface of the edge of first flooring material 1a. A floor structure in which the plurality of the flooring materials 1a to 1d is laid is then constructed by repeating the same step. In the constructed floor structure (set floor), the butt joint portion 2 is formed between the edges of the laid first flooring material 1a and second flooring material 1b. At the butt joint portion 2 of the set floor, the joint is carried out according to the following steps.

2) Injection Step

As indicated in FIGS. 2(b) and 2(c), a nozzle tip component of an injection tool 5 filled with the joint treatment agent is inserted into the butt joint portion 2 from an incision line 4 and the liquid joint treatment agent 6 is injected into the butt joint portion 2. The vinyl chloride-base resin constituting the flooring materials 1a and 1b is gradually swelled or dissolved by the liquid joint treatment agent 6 which has entered the butt joint portion 2, and finally strong bonding is realized by the synergistic effect with curing of the resin component contained in the joint treatment agent 6.

3) Adhesive Tape Attachment Step

As shown in FIG. 2(d), in the present embodiment, before the joint treatment agent is cured, an adhesive tape 3 is used and the adhesive tape 3 is pasted so as to cover the butt joint portion formed in the set floor surface. For example, the adhesive tape 3 is preferably pasted within 10 min or less immediately after the injection of the joint treatment agent is completed, and particularly preferably immediately after the injection of the joint treatment agent.

In the method for attaching the adhesive tape, as explained hereinabove with reference to FIG. 4(a), the adhesive tape 3 may be attached, before the injected joint treatment agent is cured, so as to straddle the butt joint portion such that the tape is in contact with both of the protective layer and the joint treatment agent in the butt joint portion. In other words, the adhesive tape is pasted so as to cover the entire joint treatment agent which has overflowed the protective layer surface.

It is preferred that the adhesive tape 3 be used which has a band-like base material and an adhesive layer provided on the back surface of the base material.

In particular, from the standpoint of further enhancing the drying and curing of the joint treatment agent, it is desirable that an adhesive tape be used which has a porous fibrous material, for example, such as a paper sheet, as the base material in the adhesive paste attachment step. For example, a paper sheet of cellulose fibers can be advantageously used as the paper sheet. Since the paper sheet has high air permeability, the joint treatment agent is rapidly dried, but the effect same as that obtained with the paper sheet can be also expected with a resin sheet, provided that the air permeability thereof is high.

Figure 3:
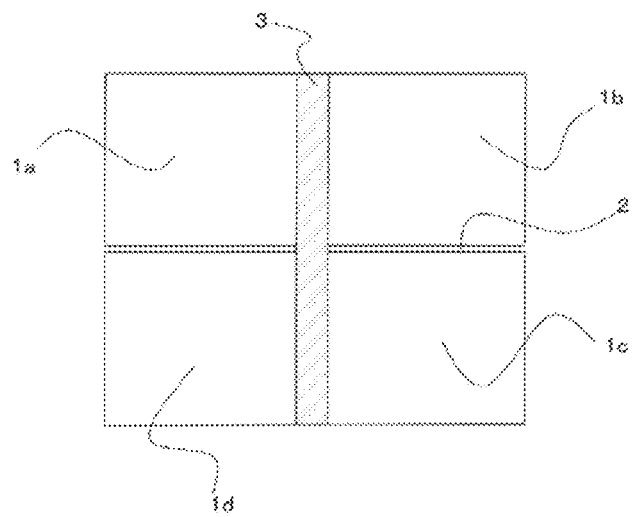
FIG. 3 shows a state in which an adhesive tape is attached to the butt joint portion, as an embodiment of the present invention.

As mentioned hereinabove, in the floor obtained by laying the flooring materials, the butt joint portion 2 is formed between the abutting end surfaces of the first flooring material 1a and the second flooring material 1b. As shown in FIG. 2(d), the longitudinal direction of the band-like adhesive tape 3 is arranged substantially parallel to the butt joint portion 2, and the band-like adhesive tape 3 is pasted on the flooring material surface so as to straddle all of the butt joint portion 2 of the first flooring material 1a and the second flooring material 1b, thereby closing the upper opening of the butt joint portion. In this case, the adhesive tape may be attached with respect to the butt joint portion of each pair of flooring materials, but it is also possible to stick a single adhesive tape so as to straddle all of the butt joint portions formed continuously after a plurality of flooring materials has been disposed such as shown in FIG. 3. FIG. 3 shows a state in which an adhesive tape is pasted so as to cover the butt joint portions formed continuously in the vertical direction in the arrangement of the flooring materials 1a to 1d shown in FIG. 1. Then, an adhesive tape may be pasted such as to cover the butt joint portions 2 formed continuously in the transverse direction.

3') Pressing Step

In the present invention, if necessary, the adhesive tape 3 may be pressed from above by using a pressing instrument simultaneously with the adhesive tape attachment step and/or thereafter.

For example, the pressing may be performed by placing the roller portion of the pressing instrument on the adhesive tape 3 shown in FIG. 3 and rotating the roller portion reciprocatingly on the adhesive tape. More specifically, this step may be implemented by pressing with the roller portion 12 of the pressing instrument as shown in FIG. 7(c). As a result, the joint treatment agent 6 can be filled deeply into the butt joint portion 2 and also the adhesive tape 3 can be attached to the joint treatment agent which has overflown to the surface of the interior sheets 1a, 1b and also penetrated into the depressions on the upper surface of the interior sheets. As a result, the joint treatment agent after curing can be more reliably and efficiently peeled off and removed.

4) Drying Step

After the joint treatment agent 6 has been injected into the butt joint portion 2, the joint treatment agent is dried until the organic solvent contained in the liquid joint treatment agent 6 is volatilized. As a result, the liquid joint treatment agent is dried and a joined portion 7 is formed. The drying may be natural drying or forced drying. In the case of forced drying, the drying may be performed, for example, by blowing cold air or warm air with a blowing device such as a blower and a drier, or by heating. In the case of natural drying, the drying time is, for example, about 30 min to 24 hours, preferably 1 hour to 5 hours.

In the process of drying the joint treatment agent 6, the vinyl chloride-based resin constituting the flooring materials 1a to 1b which have swelled or dissolved is cured, or the vinyl chloride-based resin constituting the flooring materials 1a to 1b and the resin component contained in the joint treatment agent 6 are cured, and the edge of the first flooring material 1a and the edge of the second flooring material 1b are integrally bonded through the joined portion 7 composed of the cured body made from the joint treatment agent, as a result the sealing can be performed at the butt joint portion.

5) Adhesive Tape Peeling Step

As shown in FIG. 2(e), after the joined portion 7 has been formed by drying and curing the joint treatment agent, the adhesive tape 3 is removed by peeling off from the first flooring material 1a and the second flooring material 1b. As a result, a flooring structure can be obtained in which the butt joint portion 2 is sealed by the joined portion 7 as shown in FIG. 1.

Where the butt joint portion 2 is sealed, an abutting end surface 2a of the first flooring material 1a and an abutting end surface 2b of the second flooring material 1b are substantially concealed. Therefore, the obtained floor structure has excellent water sealing ability, and since the flooring material surface is practically not damaged by the joint treatment agent, excellent appearance which is free from stain or scratches can be obtained.

Figure 4:
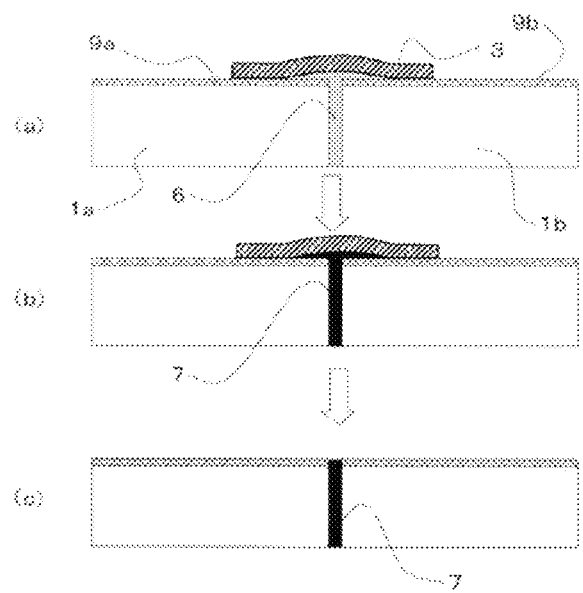
FIG. 4 shows a procedure from attachment to peeling of the adhesive tape.

According to the method according to the embodiment of the present invention, even when the excess joint treatment agent overflows from the butt joint portion in the injection step, this excessive portion can be easily removed with the adhesive tape after drying. Therefore, the joint treatment can be carried out relatively easily. For example, when the joint treatment agent 6 is injected such as to overflow somewhat from the butt joint portion, as shown in FIG. 4 (FIG. 4(a)), where the adhesive tape 3 is attached from above thereof before the joint treatment agent 6 is cured (FIG. 4(b)) and the adhesive tape 3 is peeled off after the joint treatment agent has cured, since the portion (unnecessary portion) that has protruded from the butt joint portion in the joined portion 7 adheres to the adhesive tape side, it can be removed relatively easily (FIG. 4(c)). As a result, since the joint treatment agent is allowed to overflow somewhat at the stage of the injection step, the injection step can be efficiently implemented. Generally, where a joint treatment agent is dried and cured, "thinning" (volume shrinkage) occurs, and a recess part can thus become noticeable in the butt joint portion. In contrast, in the method of the present invention, since a larger amount of the joint treatment agent can be injected, the occurrence of such recess can be reduced or prevented. As a result, the surface of the cured body in the joined portion 7 can be disposed such as to be substantially flush with the interior sheet surface (protective layer surface), as shown in FIG. 4(c).

According to the above-descried embodiment, since a step is included in which an adhesive tape is pasted over the surface of two flooring materials (interior sheets on both sides) so as to cover the butt joint portion, in particular, before the injected treatment agent of the present invention is cured, even when excessive treatment agent of the present invention overflows from the butt joint portion in the injection step, this excessive portion can be easily removed with the adhesive tape after curing. Therefore, the joint treatment can be implemented relatively easily. Further, after the injection step and before the treatment agent of the present invention is completely dried and cured, the adhesive tape serves as a protective layer and can effectively prevent dust, sand, etc., from adhering to the injected portion. As a result, practically no problem arises, for example, even when a person steps on the flooring material before the treatment agent of the present invention is completely dried and cured. Therefore, the construction process can be shortened and efficiency thereof can be increased.

Further, after the injection step and before the joint treatment agent is completely dried and cured, the adhesive tape serves as a protective layer and can effectively prevent dust, sand, etc., from adhering to the injected portion. Accordingly, practically no problem arises, for example, even when a person steps on the flooring material before the treatment agent of the present invention is completely dried and cured. Therefore, the construction process can be shortened and efficiency thereof can be increased.

Procedure of Joint Treatment (Second Embodiment)

Figure 5:
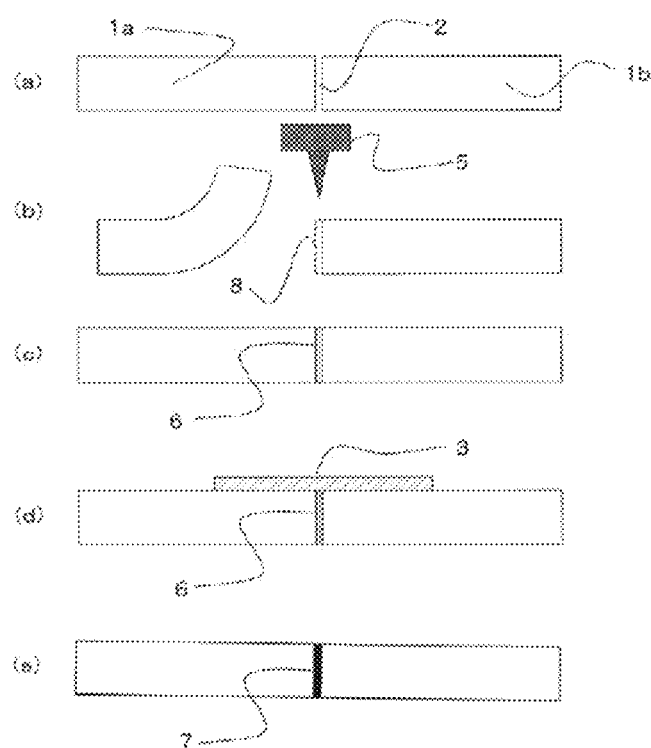
FIG. 5 shows an example of a procedure for filling a butt joint portion with a joint treatment agent, as the second embodiment of the present invention.

The second embodiment of the method of the present invention is illustrated by FIG. 5 where the depiction of the protective layer in FIG. 5 is omitted.

FIG. 5 illustrates a method including: 1) a step of laying a plurality of flooring materials (interior sheets) such that edges of the flooring materials face each other (flooring material laying step); 2) a step of lifting up at least one of the flooring materials facing each other at the butt joint portion and injecting the treatment agent of the present invention in a region corresponding to the butt joint portion (injection step); 3) a step of attaching an adhesive tape over the surface of the two flooring materials so as to straddle the butt joint portion (adhesive tape attachment step); 4) a step of drying the injected treatment agent of the present invention (drying step); and 5) a step of peeling off the adhesive tape from the flooring materials after the treatment agent of the present invention has dried (adhesive tape peeling step). The second embodiment is substantially the same as the first embodiment, except that the flooring material is lifted up in the injection step.

According to the second embodiment, since the application of the joint treatment agent is facilitated, the operation efficiency can be increased. Further, it can be easily confirmed visually whether or not the joint treatment agent is sufficiently applied. As a result, operational failures, for example, such as uncoated sections and insufficient application can be also effectively reduced. In addition to that, since the applied amount of the joint treatment agent can be increased, the butt joint portion can be filled more reliably. Furthermore, since even a high-viscosity joint treatment agent can be used without any problem, the degree of freedom of the joint treatment design is increased.

When the treatment agent of the present invention is to be injected in the injection step of the second embodiment, at least one of the flooring materials facing each other is curled, and the treatment agent of the present invention is injected in a region 8 corresponding to the butt joint portion. In this case, it is usually sufficient to lift up either one of the flooring materials.

The region 8 corresponding to the butt joint portion is not particularly restricted, provided that the butt joint portion can be joined. For example, this region may be the abutting surface (side surface) of the flooring material which is not lifted, or the periphery thereof, or the underlayment surface, or the like, where the butt joint portion is to be disposed when both flooring materials are lifted.

<Embodiment of Nozzle Member>

In the present invention a well-known nozzle member can be used as the injection instrument to be used in the abovementioned injection step, but the injection step can be performed more efficiently by using, in particular, the below-described nozzle member (member of the present invention).

Thus, the member of the present invention relates to a nozzle member for injecting the joint treatment agent into the butt joint portion of interior sheets such that:

(1) the nozzle member comprises a needle component, a nozzle body component, and a nozzle tip component, which are detachably connected to each other;

(2) the needle component is disposed at a distal end of the nozzle member and comprises a needle-shaped body and a support portion for fixing the needle-shaped body;

(3) the nozzle body component has (3a) has a flow channel A passing through in a longitudinal direction thereof; (3b) in the flow channel A, a region A1 where the support portion can be fixed at least in a direction perpendicular to the aforementioned direction by inserting the entire support portion or part thereof into the flow channel A; and (3c) a connection portion A3 for connecting to the nozzle tip component;

(4) the nozzle tip component comprises (4a) a flow channel B passing through in a longitudinal direction thereof; and (4b) a connection portion B3 for connecting to the nozzle body component; and (5) the connection portion A3 and the connection portion B3 are connected such that the flow channel B form a single flow channel, while the needle-shaped body passes through the flow channel B of the nozzle tip component and protrudes from the opening on the distal end side of the nozzle tip component, and the flow channel A and the opening and the needle-shaped body have a gap therebetween in a cross-sectional direction.

As mentioned hereinabove, the member of the present invention is configured of the needle component, nozzle body component, and nozzle tip component as the main constituent components. Therefore, in the member of the present invention, other components may be included or attached in addition to these constituent components if necessary.

Figure 12:
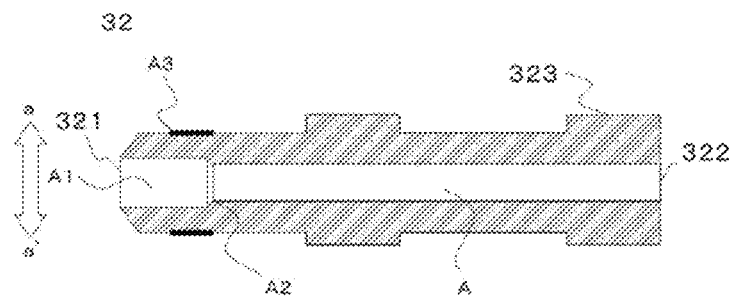
FIG. 12 is a cross-sectional view of the nozzle body component of the nozzle member of the present invention.
Figure 13:
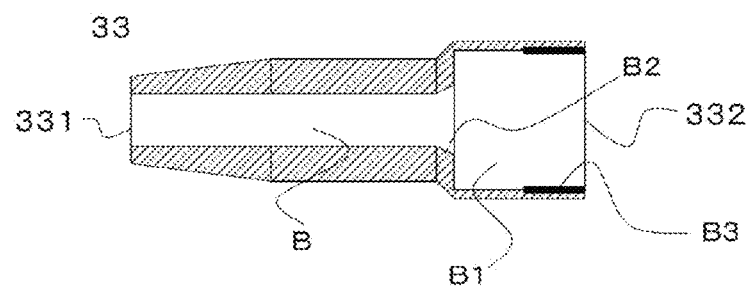
FIG. 13 is a cross-sectional view of the nozzle tip component of the nozzle member of the present invention.
Figure 23:
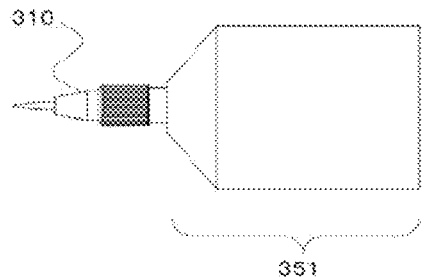
FIG. 23 illustrates an example of a treatment tool including a nozzle member of the present invention and a container for accommodating the joint treatment agent.
Figure 24:
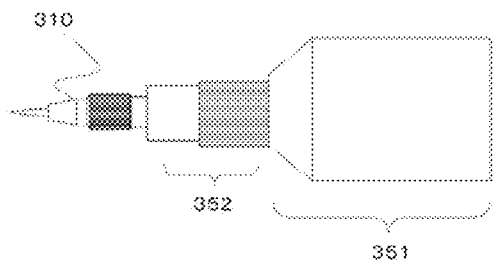
FIG. 24 illustrates an example of a treatment tool including a nozzle member of the present invention and a container for accommodating the joint treatment agent.

FIG. 11 shows an example of the needle component which is a constituent component of the member of the present invention. FIG. 12 shows an example of a nozzle body component which is a constituent component of the member of the present invention. FIG. 13 shows an example of the nozzle tip component which is a constituent component of the member of the present invention. FIGS. 23 and 24 show a product obtained by mounting a member 310 of the present invention on a container 351. The member of the present invention will be explained hereinbelow in detail with reference to these drawings.

In the member of the present invention, where the nozzle member 310 is viewed as a whole, the needle component 31 of the nozzle member (more specifically, the distal end direction of the needle-shaped body) is referred to as "distal end", and the end in the opposite direction (direction of connecting to the container opening) is referred to as "proximal end", unless specifically stated otherwise.

The joint treatment agent which is used in the member of the present invention is a liquid composition for joining the butt joint portion of interior sheets, and this agent is inclusive of resin-including seam sealers (solution type or emulsion type) which include a resin component and also of any solvent-type seam sealer composed of one or two or more solvents. In other words, any well-known or commercially available seam sealer can be applied to the member of the present invention.

(1) Needle Component

As shown in FIG. 11, the needle component 31 is disposed at the distal end of the nozzle member 310 and has a needle-shaped body 311 and a support portion 312 for fixing the needle-shaped body to the nozzle body component 32. The support portion 312 and the needle-shaped body 311 may be molded integrally, or the support portion and needle-shaped body produced separately in advance may be joined together by welding or the like.

The needle-shaped body 311 has a sharp tip, and the joint treatment agent is fed to the distal end thereof along the outer surface. The material of the needle-shaped body is not particularly limited. For example, a metal, a ceramic, or a plastic may be used. In particular, since the needle tip is relatively firmly pressed against the interior sheet or underlayment when the joint treatment agent is injected, a material with sufficient pressure resistance is preferred. From this standpoint, it is preferred that the needle-shaped body is composed of a metal or metal alloy such as stainless steel, steel, and iron. Thus, from the standpoint of strength, processability, etc., in the present invention, iron or an iron-based alloy (stainless steel, steel, etc.) is preferred, and stainless steel, which is unlikely to corrode, is particularly preferred.

The thickness, length, and degree of sharpness of the needle-shaped body 311 can be changed, as appropriate, according to the site where the needle-shaped body is to be used and the type of the joint treatment agent. For example, the needle-shaped body 311 can be set to have a thickness of the root portion of 1 mm to 2 mm and a length of 10 cm to 20 cm.

The needle-shaped body 311 of a variety of cross-sectional shapes (circular, elliptical, triangular, rectangular, etc.) can be employed, and the shape thereof is not particularly limited. However, a circular cross-sectional shape is more preferred because of excellent strength, construction property, and operability.

The support portion 312 functions to fix the needle-shaped body 311 to the nozzle body component 32. The support portion 312 also functions as a connection portion for connecting to the nozzle body component 32 and acts to control the flow rate of the joint treatment agent.

When the needle component 31 and the nozzle body component 32 are connected each other, the support portion 312 is fitted in the region A1 of the nozzle body component 32. As a result, the support portion is fixed at least in a direction (a-a') perpendicular to the longitudinal direction of the nozzle body portion. In this case, where the outer dimensions of the support portion 312 and the inner dimensions of the region A1 of the body portion 32 are closer to each other, wobbling of the needle-shaped body 311 in the perpendicular direction can be reduced more effectively. Further, the needle-shaped body 311 can be better prevented from wobbling when the contact area or the number of contact zones of the outer surface of the support portion 312 and the region A1 of the body portion 32 are larger.

In this case, it is necessary to impart a cross-sectional shape to the flow channel A and/or the support portion 312 such that can ensure the flow of the joint treatment agent. In particular, from the standpoint of easiness of processing of the member, it is preferred that the support portion 312 has a cross-sectional shape such that the joint treatment agent flows from the flow channel A into the flow channel B. As a consequence, several support portions 312 that differ in a cross-sectional area can be used selectively, thereby enabling the appropriate adjustment to the desired flow rate of the joint treatment agent. Meanwhile, the support portion 312 can be also selectively used, for example, according to the viscosity of the joint treatment agent. For example, the discharge rate decreases with the increase in the viscosity of the joint treatment agent, provided that the flow channel area is the same, but by using the support portion having a smaller cross-sectional area, it is possible to ensure the desired discharge rate of the joint treatment agent.

The cross-sectional shape of the support portion 312 is not particularly limited provided that the desired flow rate of the joint treatment agent can be ensured, and can be set as appropriate. It is preferred that the shape of the support portion 312 be designed to achieve the balance of two aspects, namely, the reducing effect of wobbling of the needle component 31 and the discharge rate of the joint treatment agent.

For example, as shown in FIG. 14(a), FIG. 14(b), and FIG. 14(c), the support portion 312 can have various cross-sectional shapes, for example, a substantially plate-like shape (a), a substantially cross-like shape (b), and a substantially triangular shape (c). FIGS. 14(a) to 14(c) illustrate the case where the flow channel A has a circular cross section and the support portion 312 is inserted therein.

As a result of inserting the substantially plate-like support portion 312 in the flow channel A of the nozzle body component 32, as shown in FIG. 14(a), the flow channel is narrowed, and therefore, the discharge amount of the joint treatment agent can be controlled. In this case, for example, as shown in FIG. 14(a), an even larger discharge amount of the joint treatment agent can be obtained by using a replacement needle component having the support portion 312 with a smaller plate thickness. Meanwhile, by using the replacement needle component 31 having the support portion 312 with a larger plate thickness, the contract surface area of the outer surface (side surface) of the support portion 312 and the region A1 of the body portion 32 increases and wobbling of the needle component 31 can be further reduced.

FIG. 14(a) shows the support portion 312 having a substantially plate-like cross-sectional shape. In this shape, the reduction of wobbling of the needle component 31 (in particular, the needle-shaped body 311) and the discharge rate of the joint treatment agent can be easily balanced by adjusting the plate thickness. An additional merit is that the production is easy and inexpensive.

FIG. 14(b) shows the support portion 312 with a substantially cross-like cross-sectional shape. With such a shape, where the support portion is inserted into the flow channel A, the number of contact zones of the outer surface of the support portion 312 and the region A1 of the nozzle body component 32 is four, and wobbling of the needle component 31 (in particular, the needle-shaped body 311) can be further reduced while ensuring the discharge amount of the joint treatment agent.

FIG. 14(c) shows the support portion 312 having a substantially triangular cross-sectional shape. With such a shape, where the support portion is inserted into the flow channel A, the number of contact zones of the outer surface of the support portion 312 and the region A1 of the nozzle body component 32 is three, and wobbling of the needle component 31 (in particular, the needle-shaped body 311) can be further reduced while ensuring the discharge amount of the joint treatment agent. The substantially triangular support portion 312 is particularly preferred because satisfactory balance of the reduction of wobbling of the needle component 31 and the discharge rate of the joint treatment agent is ensured and the processing is also relatively easy.

Figure 14:
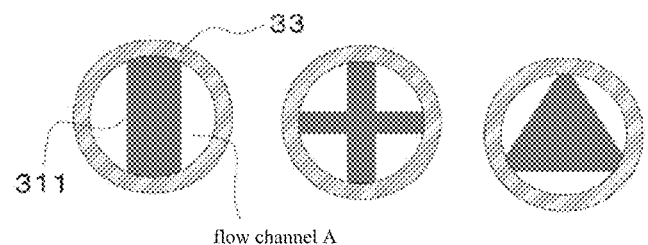
FIG. 14(a), FIG. 14(b), and FIG. 14(c) are cross-sectional views illustrating a state in which the support portion 32 is installed in the flow channel A, where
Figure 15:
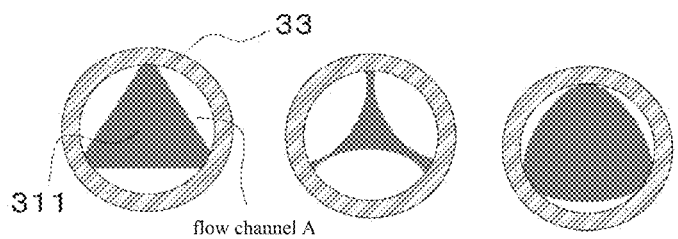
FIG. 15(a), FIG. 15(b), and FIG. 15(c) are cross-sectional views illustrating a state in which the support portion 32 is installed in the flow channel A, where

In the configurations such as shown in FIGS. 14(a) to 14(c), the discharge amount or the like can be also accurately controlled by somewhat changing the cross-sectional shape. For example, as shown in FIG. 15(a), FIG. 15(b), and FIG. 15(c), the discharge amount of the joint treatment agent can be increased, for example, by using the cross-sectional shape (FIG. 15(b)) in which all sides are curved inward with respect to the substantially triangular support portion 312 (FIG. 15(a)) such as shown in FIG. 14(c). Conversely, the discharge amount of the joint treatment agent can be decreased by using the cross-sectional shape (FIG. 15(c)) in which all sides are curved outward. By so changing how the sides are curved, it is possible to adjust easily the discharge amount even when the joint treatment agent which is to be used is changed.

As shown in FIG. 11, the support portion 312 may have a tapered portion 313 where the cross-sectional area of the part of the support portion 312 on the distal end side decreases gradually toward the distal end of the needle-shaped body. As a result of providing the tapered portion 313, it is possible to contribute to the strong connection of the needle component 31 and the nozzle tip component, for example, by pressing the nozzle tip component 33 against a stopper portion B2 of the flow channel B at a high pressure when connecting the nozzle tip component 33.

Further, as shown in FIG. 11, the tapered portion 314 where the cross-section decreases gradually toward the proximal end may be also provided on the proximal end side of the support portion 312, as necessary. As a result, the insertion of the support portion 312 into the flow channel B is facilitated.

(2) Nozzle Body Component

As shown in FIG. 12, the nozzle body component 32 has the flow channel A passing through in the longitudinal direction thereof. The joint treatment agent is distributed to the flow channel A.

The cross-sectional shape of the flow channel A is not particularly limited and may be, for example, circular, elliptical, or rectangular. From the standpoint of processability, the circular shape is preferred. The cross-sectional size of the flow channel A is also not limited, but usually the inner dimensions can be set, as appropriate, within a range of about 2 mm to 6 mm. Therefore, for example, when the flow channel A has a circular cross-sectional shape, the diameter thereof can be set in a range of 2 mm to 6 mm. The region A1 is formed such that the support portion 312 can be inserted from the opening 321 of the nozzle body component 32 on the distal end side or proximal end side of the flow channel A. In this case, for example, as shown in FIG. 11, the structure can be employed such that the entire support portion 312 or part thereof can be inserted from the opening 321 on the distal end side of the flow channel A.

The flow channel A has the region A1 such that by inserting the entire support portion 312 or part thereof into the region, the support portion can be fixed at least in the direction perpendicular to the aforementioned direction. The support portion 312 is inserted into the region A1. As a result, the support portion 312 is fixed at least in the direction perpendicular to the aforementioned direction. For example, in FIG. 12, the support portion can be fixed at least in the a-a' direction. The fixing in this case includes not only complete fixing in a state in which the support portion 312 does not move at all in the corresponding direction, but also the case where the support portion moves slightly within a range where no problem is occurred with respect to the joint treatment using the member of the present invention when the construction is performed using the member of the present invention.

A method for performing such fixing is not particularly limited. For example, the support portion 312 can be fixed in the direction perpendicular to the longitudinal direction of the nozzle body portion 32 by providing the entire side surface of the support portion 312 or part thereof having a shape such that it can be in contact with the inner surface of the nozzle body component 32 in the region A1. For example, as shown in FIG. 14(*a*), FIG. 14(*b*), and FIG. 14(*c*), where the outer dimensions of the cross-section of the support portion 312 are made substantially the same as the inner dimensions of the cross-section of the region A1 in the nozzle body component 32, the entire side surface of the support portion or part thereof can be in contact with the inner surface of the nozzle body component 32 in the region A1. Therefore, the support portion 312 can be prevented from moving at least in the a-a' direction by the contact surface.

Here, when the support portion 312 is inserted in the region A1, it is desirable that a control mechanism A2 for controlling the movement of the inserted support portion 312 in the longitudinal direction be provided inside the flow channel A, as shown in FIG. 12, so as to prevent the support portion 312 from entering too deep into the region A1 (and then into the flow channel A). A method for constructing the control mechanism is not particularly limited provided that a means is used such that the movement of the support portion 312 in the direction parallel to the longitudinal direction of the nozzle body component 32 can be restricted within a range in which the joint treatment is possible. In other words, a means for fixing such that the support portion 312 substantially does not move in the direction parallel to the longitudinal direction of the nozzle body portion 32, or a means for fixing such that the support portion 312 moves within a certain range but cannot move outside this range can be used. More specifically, in addition to the method for forming a stopper portion inside the flow channel A, as shown in FIG. 12, for example, a method of installing an elastic member such as a spring, a hollow solvent-resistant elastic body (rubber etc.) and the like which are capable of sustaining the support portion inside the flow channel A can be used as such means. As an example of the control mechanism, the case where the stopper portion A2 is formed inside the flow channel A will be explained hereinbelow.

The form of the stopper portion A2 is not particularly restricted, provided that no problem is created with respect to the flow of the joint treatment agent. For example, as shown in FIG. 12, when the flow channel A has a circular cross-sectional shape, as a result of forming the flow channel A outside the region A1 so as to have an inner diameter less than the diameter of the support portion 312, it is possible to use a step created by such a difference in the inner diameters as the stopper portion A2. Alternatively, for example, as shown in FIG. 21, the stopper portion A2 can be obtained by forming the entire flow channel A so as to have the same inner diameter and then forming a convex portion inside the flow channel A at a location within a range such that part of the support portion 312 can be inserted in the flow channel A.

In the nozzle body component 32, the entire support portion 312 or part thereof mates with the flow channel A1 so that the joint treatment agent can flow. Here, the expression "the entire . . . mates" means that the surface of the support portion 312 on the distal end side and the surface of the flow channel A at the opening 321 substantially match after the mating. In the present invention, from the standpoint of fixing the needle component 31 more firmly, it is desirable that part of the support portion 312 be mated with the flow channel A1. Thus, it is desirable that fixing be performed such that part of the support portion 312 protrudes from the opening 321. In such a case, as a result of the protruding portion being pushed by the nozzle tip component 33, the support portion 312 can be more firmly fixed by the pressure in the vertical direction.

The nozzle body component 32 has a connection portion A3 for connecting to the nozzle tip component. This connection portion A3 enables detachable connection to the nozzle tip component 33.

The shape or form of the connection portion A3 is not particularly limited. For example, thread-fixing (screwing) and coupling-fixing such as quick coupling for fluid and one-touch coupling can be used. For example, in the case of thread-fixing, a threaded portion A3 is provided on the outer circumference of the tip of the nozzle body component 32 in order to thread-fix the nozzle body component to the nozzle tip component. From the standpoint of high jointing strength, it is preferred that the threaded portion A3 be directly formed by machining of the outer circumference of the tip of the nozzle body component 32. The thread-fixing is preferred because it involves relatively easy processing and can be realized with a simple configuration.

As shown in FIG. 12, the nozzle body component 32 can be provided, as necessary, with one or two or more sliding stoppers 323 on the surface thereof. As a result, manual handling is facilitated when the components are mounted. In particular, the nozzle body component 32 and the nozzle tip component 33 can be firmly fixed with fingers.

The material of the nozzle body component 32 is not particularly limited, but from the standpoint of realizing firmer connection, it is preferred that the nozzle body component be configured of a metal or alloy such as brass, iron, and stainless steel. Brass is particularly preferred because it is easy to process and has a relatively high rust resistance.

(3) Nozzle Tip Component

As shown in FIG. 13, the nozzle tip component 33 has the flow channel B passing through in the longitudinal direction thereof. The joint treatment agent is to be distributed to the flow channel B.

The cross-sectional shape of the flow channel B is not particularly limited and may be, for example, substantially circular, substantially elliptical, or substantially rectangular. From the standpoint of processability, the circular shape is preferred. The cross-sectional size of the flow channel B is also not limited, but usually the inner dimensions can be set, as appropriate, within a range of about 1.5 mm to 4 mm. Therefore, for example, when the flow channel B has a circular cross-sectional shape, the diameter thereof can be set in a range of 1.5 mm to 4 mm.

Figure 17:
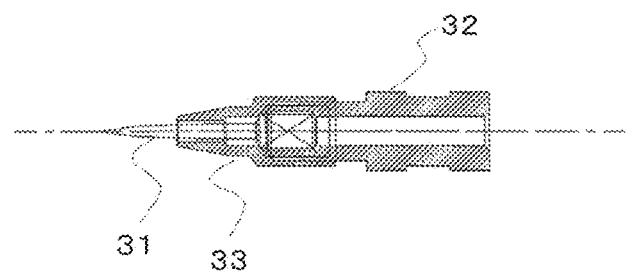
FIG. 17(a) and FIG. 17(b) show the nozzle member fabricated in Example 3-1, where
Figure 17:

A connection portion B3 for connecting to the nozzle body component 32 is provided at the proximal end side of the flow channel B. This connection portion B3 is used for joining to the connection portion A3. As a connection mode, for example, as shown in FIG. 17(a) and FIG. 17(b), it is desirable that the connection portion A3 is connected to the connection portion B3 such that the flow channel A and the flow channel B form a single flow channel, while the needle-shaped body 311 pass through the flow channel B of the nozzle tip component and protrude from the opening 321 on the distal end side of the nozzle tip component, and the opening 321 and the needle-shaped body have a gap in the cross-sectional direction. By joining the connection portion B3 to the connection portion A3, it is possible to connect the nozzle tip component 33 and the nozzle body component 32 detachably to each other.

The shape or form of the connection portion B3 is not limited. For example, similarly to the connection portion A3, thread-fixing (screwing) and coupling-fixing such as quick coupling for fluid and one-touch coupling can be employed. For example, in the case of thread-fixing, a threaded portion B3 is formed on the inner circumferential surface of the proximal end side of the flow channel B. Further, a region B2 where the distal end of the nozzle body component 32 can be inserted in the flow channel B is formed such that the threaded portion B3 and the threaded portion A3 are configured as a female thread and a male thread, respectively, and can be connected by screwing together. As a result, the tip of the nozzle body component 32 can be attached by insertion into the region B1. Furthermore, since the threaded portion B3 is formed on the inner circumference of the region B1, this portion serves as a female thread, the threaded portion A3 of the nozzle body component 32 serves as a male thread, and the nozzle tip component 33 is connected and fixed to the nozzle body component 32.

In the flow channel B, a stopper portion B2 that receives the support portion 312 is formed in the region B1 so as to prevent the support portion 312 of the needle component 31 from moving to the distal end side of the flow channel B and wobbling. As a result, the needle component 31 can be fixed such as to be sandwiched between the nozzle body component 32 and the nozzle tip component 33.

Figure 22:
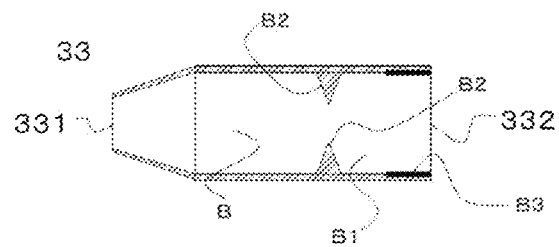
FIG. 22 is a cross-sectional view illustrating an example of the case where a stopper portion B2 is formed in the nozzle body component.

The form of the stopper portion B2 is not particularly restricted, provided that no problem is created with respect to the flow of the joint treatment agent. For example, as shown in FIG. 13, when the flow channel B has a circular cross-sectional shape, as a result of forming the flow channel B outside the region B1 so as to have an inner diameter less than the maximum long diameter of the support portion 312, it is possible to use a bump formed by such a difference in the inner diameters as the stopper portion B2. Alternatively, for example, as shown in FIG. 22, the stopper portion B2 can be formed by forming the entire flow channel B to have the same inner diameter and then forming a convex portion inside the flow channel B at a location within a range such that part of the support portion 312 can be inserted in the flow channel B.

The stopper portion B2 of the flow channel B is preferably formed, as shown in FIG. 13, such that the inner diameter thereof decreases gradually as the distal end is approached. In such a case, the support portion 312 is strongly pressed in a wedge-like fashion against the flow channel B, while the stopper portion is abutted against the tapered portion 313 of the support portion 312 of the needle component 31. As a result, the constituent components can be joined more firmly.

As shown in FIG. 13, one or two or more sliding stoppers 333 can be provided, as necessary on the outer circumferential surface of the nozzle tip component 33. As a result, manual handling is facilitated when the components are mounted. In particular, the nozzle body component 32 and the nozzle tip component 33 can be relatively firmly fixed with fingers.

The material of the nozzle tip component is not particularly limited, but from the standpoint of realizing firmer connection, it is preferred that the nozzle tip component be composed of a metal or alloy such as brass, iron, and stainless steel. Brass is particularly preferred because it is easy to process and has a relatively high rust resistance.

2. Assembly of Nozzle Member for Joint Treatment

Figure 16:
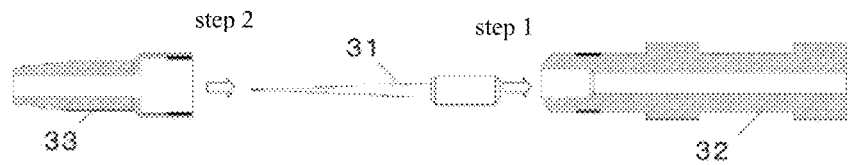
FIG. 16 illustrates an exemplary procedure from the assembling of the nozzle body component and the nozzle tip component until the completion of the nozzle of the present invention.

The member of the present invention can be fabricated, for example, as shown in FIG. 16, by a method comprising: 1) a step of inserting the entire support portion 312 of the needle component 31 or part thereof in the region A1 of the nozzle body component 32 (step 1); and 2) allowing the needle-shaped body 311 of the needle component 31 mounted on the nozzle body component 32 to pass through the flow channel B of the nozzle tip component and connecting the connection portion A3 of the nozzle body component 32 to the connection portion B3 of the nozzle tip component 33 (step 2). This series of steps basically can be easily performed, for example, with fingers, without using special tools. As a result, a structure can be constructed such that the flow channel A and the flow channel B form a single flow channel, while the needle-shaped body passes through the flow channel B of the nozzle tip component and protrudes from the opening 321 on the distal end side of the nozzle tip component, and a gap in the cross-sectional direction is formed between the opening 321 and the needle-shaped body 311.

Further, when the member of the present invention is disassembled, it can be disassembled to the constituent components by a reverse procedure (that is, in the order of step 2→step 1). This series of steps usually can be also easily performed, for example, with fingers without using special tools.

Since the components of the member of the present invention can thus be repeatedly assembled and disassembled relatively easily with fingers, or the like, the constituent components can be washed or replaced for example, in a simple manner over a relatively short time.

3. Joint Treatment Tool

The present invention is also inclusive of a joint treatment tool which comprises the member 310 of the present invention and a container for accommodating the joint treatment agent and in which the opening 321 in the flow channel A of the nozzle body component 32 of the nozzle member 310 is directly or indirectly connected to the opening of the container.

FIG. 23 shows an example of a joint treatment tool with the aforementioned "direct" connection in which the member 310 of the present invention and a container 351 are connected without another member.

FIG. 24 shows an example of a joint treatment tool with the aforementioned "indirect" connection in which the member 310 of the present invention and the container 351 are connected through another member such as an adapter 352 for example.

The container, adapter, etc., can be from a metal or an alloy or from a solvent-resistant synthetic resin. The size and shape thereof can be set, as appropriate, for example, according to the type of the joint treatment agent to be used, the site of use, and workability.

Further, means for connecting the nozzle body component 32 of the member 310 of the present invention to the container opening, connecting the nozzle body component 32 of the member 310 of the present invention to the adapter, and connecting the adapter to the container opening are not particularly limited, provided that the member 310 of the present invention itself can be disassembled and assembled. For example, well-known connection means such as screwing, coupling-fixing, adhesive bonding, press-affixing, and fitting can be used as appropriate.

4. Usage of Member of the Present Invention (Joint Treatment Method)

The member 310 of the present invention can be used similarly to the well-known or commercially available nozzle members. For example, where the member 310 of the present invention is mounted on the opening of the container filled with the joint treatment agent, it can be directly used for the joint treatment. Thus, the joint treatment agent can be injected in the butt joint portion by inserting the needle-shaped body 311 of the nozzle member 310 of the present invention in the butt joint portion of interior sheets and feeding the joint treatment agent to the distal end of the needle-shaped body 311.

The site of use and material of the interior sheets are not particularly restricted. Suitable examples of sites of use include floors and walls. As for materials, any sheets composed of various synthetic resins such as a vinyl chloride-based resin or the like can be used.

The joint treatment agent is also not particularly restricted, and well-known or commercially available joint treatment agents can be used. The joint treatment agent is also referred to as dope cement including a solvent that swells or dissolves a resin component contained in the interior sheets. Examples of suitable joint treatment agents include: 1) a joint treatment agent composed of any one solvent selected from tetrahydrofuran (THF), methyl ethyl ketone (MEK), and cyclohexane, or a mixed solvent of two or more thereof; and 2) a joint treatment agent in which a thermoplastic resin such as a vinyl chloride resin is dissolved or dispersed at a ratio of 50 mass % or less, preferably 15 mass % or less, and more preferably 10 mass % or less in one of the aforementioned solvents or a mixture of two or more thereof.

In particular, in the present invention, even when a joint treatment agent having a relatively high content (content of solids) of the resin component is used, the joint treatment agent can be prevented from clogging by selectively using, as appropriate, several types of the needle component 31 with support portions 312 having different cross-sectional shapes, or even when the joint treatment agent solidifies and clogging occurs, the constituent components can be disassembled and easily washed. In this regard, the member 310 of the present invention is an optimum member for the joint treatment agent with a large amount of resin component.

A solvent capable of swelling or dissolving the synthetic resin constituting the interior sheets can be used for the joint treatment agent. For example, when the interior sheet comprises a vinyl chloride-based resin, tetrahydrofuran, or the like, can be used as the solvent. In particular, it is preferred that a joint treatment agent be used in which a resin of the same type as a resin contained in a resin flooring material is dissolved or dispersed. In this case, because the resin of the same type is interposed in the joint, even a butt joint portion of a relatively large width can be reliably closed and water sealing between the interior sheets is increased. For example, where the resin flooring material is made from a vinyl chloride resin, it is preferred that a vinyl chloride-based resin be used as the resin of the same type.

Where the resin to be included in the joint treatment agent is to be dissolved in a solvent, a solvent-soluble resin is used where the resin is to be dispersed in a solvent, resin particles are used in the form of emulsion or suspension. In particular, when flooring materials made from a vinyl chloride resin are to be joined, the effect of filling fine gaps in the joining zones is increased by using a joint treatment agent including suspended particles of a vinyl chloride-based resin with a degree of polymerization of 800 to 1500 and preferably a degree of polymerization of 1000 to 1300.

The viscosity (23° C.) of the joint treatment agent is not particularly limited, but in order to facilitate the penetration and uniform spread in a butt joint portion of interior sheets, it is desirable that the liquid agent have the abovementioned viscosity. Accordingly, for example, the viscosity can be set to 1000 mPa·s or less, or 500 mPa·s or less. Where the viscosity of the joint treatment agent is too large, the agent is unlikely to penetrate into the butt joint portion and is unlikely to spread. Meanwhile, where the viscosity of the joint treatment agent is too small, workability is degraded and the joint treatment agent can be unintentionally dropped on the surface of the interior sheet. Therefore, it is preferred that the viscosity of the joint treatment agent be 5 mPa·s or more and more preferably 10 mPa·s or more. As a result of setting such a viscosity, unintentional sagging is unlikely to occur and workability is further improved. Well-known or commercially available joint treatment agents of this type can be used. Examples of commercially available products that can be advantageously used include "PVC-COLD-WELDING LIQUID TYPE A" and "PVC-COLD-WELDING PASTE TYPE T" manufactured by Werner Müller GmbH and "Toli Super Seam sealer" manufactured by Toli Corporation. In particular, "PVC-COLD-WELDING LIQUID TYPE A" is more preferred because it can be adjusted to the suitable viscosity. In addition, a seam sealer disclosed in Japanese Patent Application Laid-open No. H8-157804 can be also used, for example, with flooring materials made with using a vinyl chloride-based resin.

Since the support portion 312 of the needle component 31 divides the flow channel of the joint treatment agent in the flow channel A of the nozzle body component 32 and the flow channel B of the nozzle tip component, the support portion exhibits the effect of stirring the joint treatment agent in the container 351. Therefore, even when the solvent component, resin component, etc., in the joint treatment agent are separated, since the joint treatment agent is stirred due to this effect, the joint treatment agent is supplied to the butt joint portion in a uniform state.

Further, since the flow channel A of the nozzle body component 32 and the flow channel B of the nozzle tip component 33 are partially narrowed by the support portion 312 of the needle component 31, when the joint treatment agent is discharged by pressing the container 351, the pressure applied to the joint treatment agent in the narrowed portion of the flow channel rises. As a result, even with the joint treatment agent with a relatively high TI value, the joint treatment agent can be stably supplied to the butt joint portion by applying a pressure and temporarily reducing the viscosity of the agent. For example, The TI value of the joint treatment agent is usually 1.0 or more. The upper limit of the TI value of the joint treatment agent is not particularly limited and is usually 8.0 or less and preferably 7.0 or less.

In accordance with the present invention, a nozzle member for joint treatment can be provided such that components thereof can be relatively easily assembled and disassembled and a seam sealer can be supplied more stably.

In the present invention, since the nozzle member is mainly configured of the needle component, nozzle body component, and nozzle tip component having specific structure, the central axis of the needle-shaped body can be stably disposed in a substantially central portion of the opening of the nozzle tip component. Therefore, the seam sealer can be discharged more uniformly and stably.

Further, in the nozzle member for joint treatment of the present invention, by contrast with the conventional integrated nozzle members, the components can be easily assembled and disassembled with fingers or the like. Therefore, the components can be replaced or washed easily and over a relatively short time. In particular, by using selectively several types of support portions having different cross-sectional shapes (cross-sectional areas) in the needle component, it is possible to control the discharge amount, discharge rate, etc., of the seam sealer. For example, with a high-viscosity seam sealer which is hard to use in the conventional nozzle members, even such a seam sealer can be relatively easily used by replacing the needle component of the member of the present invention.

Further, in the nozzle member for joint treatment of the present invention, since the needle component can be easily fixed with the support portion, a relatively short needle-shaped body can be effectively used. In the integrated nozzle member such as in the prior art examples, a relatively long metal needle needs to be prepared in order to fix the proximal end portion of the metal needle by clamping, which makes it difficult to use a shorter metal needle. By contrast, in the present invention, since a fixing method using no clamping is used, a short needle-shaped body can be introduced. Further, since the support portion of the needle component can be disposed at the distal end of the nozzle body component, the seam sealer can be used up substantially to the very end.

The nozzle member for joint treatment of the present invention which has the above-described features can be advantageously used, for example, as a tool for injecting a seam sealer into a joint of interior sheets such as flooring materials and wall materials.

<Embodiment of Roller>

1. Pressing Instrument for Joint Treatment

The pressing instrument for joint treatment of the present invention is used when the uncured joint treatment agent is pressed through the adhesive tape in order to remove the joint treatment agent after curing, the pressing instrument comprising:

(1) a) a gripping portion; b) a support portion connected to the gripping portion; and c) a rotatable roller portion mounted on the support portion, (2) the roller portion including a core composed of a hard material and an elastic layer laminated adjacently to an outer circumference of the core, the elastic layer being disposed as an outermost layer of the roller portion.

FIG. 8 shows the external appearance of an example of the pressing instrument for joint treatment of the present invention (instrument of the present invention). In an instrument 10 of the present invention shown in FIG. 8, a support portion 13 is connected to the distal end of a gripping portion 11. A roller portion 12 is rotatably mounted on the distal end of the support portion 13.

In the joint treatment, operations can be performed manually by gripping the gripping portion 11 with hand. The size and shape of the gripping portion 11 are not particularly restricted and may be such as to enable easy gripping by an adult person. Further, the material of the gripping portion 11 is not limited. For example, any of wood, plastics, and metals can be used.

The support portion 13 is connected at one end to the gripping portion 11. Where the gripping portion 11 is of a cylindrical shape, as shown in FIG. 8, the support portion 13 may be mounted on the bottom surface thereof. The connection method is not particularly limited, as long as the prescribed strength, etc., can be ensured. For example, fixing by screwing or fixing with an adhesive can be used. Further, in FIG. 8, the support portion 13 and the gripping portion 11 are shown as separate components, but the present invention is also inclusive of the case where the two are produced integrally.

The roller portion 12 is mounted on the other end of the support portion 13 such that the roller portion 12 can rotate. A system identical to that of the well-known or commercially available rotary rollers may be used as a mounting means. For example, a mounting method using a bearing can be advantageously used.

The size and shape of the support portion 13 can be set, as appropriate, for example, according to the size of the roller portion which is to be mounted. Further, in FIG. 8, the support portion 13 is mounted on one of the bottom surfaces of the roller portion, but the support portion 13 may be also mounted on both bottom surfaces of the roller portion. The material of the support portion 13 may be such that enables sufficient transfer of the specific pressing intensity to the roller portion. Usually, it is desirable that, for example, a metal (for example, stainless steel) can be used.

When the roller portion 12 is pressed against the uncured joint treatment agent through the adhesive tape, the roller portion is in contact with the adhesive tape surface. FIG. 9 shows a state in which the roller portion 12 in FIG. 8 is viewed from the direction A.

As shown in FIG. 9, the roller portion 12 includes the core 21 composed of a hard material and an elastic layer 22 laminated adjacently to the outer circumference of the core, the elastic layer 22 is disposed as the outermost layer of the roller portion. In FIG. 9, the elastic layer 22 is laminated on the outer circumference of the cylindrical core 21 so as to be concentric therewith, as viewed from the direction A. In FIG. 9, the support portion 13 is exposed, but it may also be not exposed.

The core 21 comprises a hard material. The core 21 mainly has a function of using the hardness thereof to spread the uncured joint treatment agent deep into the butt joint portion. Since the butt joint portion of interior sheets usually has a very small gap, the joint treatment agent is unlikely to flow deep into the butt joint portion and it takes time for the agent to flow deeply. By contrast, where the instrument of the present invention is used, the joint treatment agent can be effectively pressed particularly deep by the pressure created by the core 21.

From this standpoint, a material having a desirable hardness can be selected as the hard material constituting the core 21. For example, a meal, a hard plastic, or a ceramic can be advantageously used. In particular, for example, a metal such as iron, stainless steel, and brass is preferably used because a high hardness and the pressing effect created by own weight can be expected.

Further, in FIG. 9, the core 21 is configured of a single hard material, but it may be also configured by coaxially laminating mutually two or more different hard materials.

As shown in FIG. 9, the elastic layer 22 is laminated adjacently to the outer circumference of the core 21 and disposed as an outermost layer of the roller portion. The elastic layer 22 has a function of bringing the adhesive tape entirely into intimate contact with the joint treatment agent when the uncured joint treatment agent is pressed by the roller portion 12 from above the adhesive tape. For example, in case that fine depressions and protrusions are formed by embossing or the like, on the interior sheet surface, since the elastic layer 22 is particularly capable of transferring the pressure so as to enable sufficient contact of the adhesive tape even with the depressions, the cured joint treatment agent can be efficiently removed by peeling off the adhesive tape.

From this standpoint, an elastic material can be used for configuring the elastic layer 22. For example, a rubber foamed material (sponge) can be advantageously used. Examples of suitable rubber include well-known and commercially available products such as natural rubber, styrene butadiene rubber, butadiene rubber, chloroprene rubber, butyl rubber, nitrile rubber, acryl rubber, ethylene-propylene rubber, urethane rubber, silicone rubber, and fluoro rubber. Foam obtained by foaming (porous material) these rubbers by compounding a foaming agent can be preferably used.

The hardness and thickness of the elastic layer 22 may be set, as appropriate, according to the types of the interior sheets, joint treatment agent, and elastic layer to be used in the construction. The hardness is usually 50 or less, in particular 5 to 30, and more preferably 5 to 20, as usually measured with Asker type C (SRIS (Japan Rubber Association Standard) 0101). Further, the thickness is usually about 1 mm to 10 mm, in particular 1 mm to 5 mm, and more preferably 1 mm to 3 mm. As a result of setting the thickness in such ranges, it is possible to impart the functions of the elastic layer and core more effectively.

In FIG. 9, the elastic layer 22 is formed over the entire outer circumferential surface of the core 21, but may be formed only on part of the outer circumference. Further, the elastic layer 22 may be formed integrally with the core 21, or an adhesive layer sheet may be laminated by retrofitting, for example, by using an adhesive agent or adhesive tape on the outer circumference of the core 21.

Further, in FIG. 9, the elastic layer 22 is configured of a single elastic material, but it may be also configured by coaxially laminating mutually different elastic materials.

The instrument of the present invention can be used when pressuring the uncured joint treatment agent through the adhesive tape. The joint treatment agent may be pressed from above the adhesive tape by bringing the elastic layer 22 into contact with the adhesive tape and rotating the roller portion back and forth. A more specific method of use is described in the following examples.

According to the present invention, it is possible to provide a pressing instrument which is used when pressing the uncured joint treatment agent through the adhesive tape for removing the joint treatment agent after curing and also to provide a joint treatment method using the instrument.

In particular, in the present invention, a joint treatment agent such that does not dissolve the protective layer of the interior sheet surface is injected, then the adhesive tape is attached to the butt joint portion before such a joint treatment agent is cured, and the agent is pressed with the pressing instrument of the present invention. As a result, the entire narrow butt joint portion can be filled with the joint treatment agent and the adhesive tape can be effectively brought into contact and attached to the joint treatment agent located in the depressions of the interior sheet surface. Accordingly, it is possible to remove efficiently the excessive joint treatment agent present on the protective layer when the adhesive tape is torn off after the treatment.

For this reason, in the step of injecting the joint treatment agent, the joint treatment agent may somewhat overflow from the butt joint portion to the protective layer surface. As a result, the injection step can be quickly completed. The combined result of the above-described features is that the joint treatment can be efficiently realized and performance inherent to the protective layer can be effectively exhibited.

In addition, in the present invention, since the adhesive tape is attached before the joint treatment agent is cured, the adhesion of dust, dirt, sand, or the like, to the joint treatment agent can be prevented, and the construction can be immediately used without waiting for the joint treatment agent to cure. For example, in the case of construction using flooring materials as interior sheets, since the adhesive tape is stuck to the flooring material surface, no significant problem is occurred even when a person steps on the flooring material.

The method of the present invention having such features is advantageous for installing interior sheets (in particular flooring material sheets), for example, in houses, commercial facilities, medical facilities, indoor passages, external corridors, verandas, balconies, or the like.

EXAMPLES

Features of the present invention will be explained hereinbelow in greater detail on the basis of examples and comparative examples. However, the scope of the present invention is not limited to the examples.

Example 1-1

In Example 1-1, a resin solution was prepared by using a powdered vinyl chloride-vinyl acetate resin (product name "SOLBIN M5R", manufactured by Nissin Chemical Industry Co., Ltd., vinyl chloride content 76.3 mass %, vinyl acetate content 23 mass %, dicarboxylic acid content 0.7 mass %, and particle size 100 µm to 120 µm) as a resin component, mixing the resin component with ethanol, adding methyl ethyl ketone (MEK) to the mixture, and dissolving the vinyl chloride-vinyl acetate copolymer.

Then, a joint treatment agent was obtained by adding a pigment (manufactured by Dainichiseika Color & Chemicals Mfg. Co., Ltd.), an antibacterial and antifungal agent (product name "DENICIDE BF-1", manufactured by Nagase ChemteX Corporation), a plasticizer (diisononyl phthalate (DINP)), and a stabilizer (product name "SB-35", manufactured by Tokyo Fine Chemical Co., Ltd.) to the resulting resin solution. Ratios of the components in the treatment agent are shown in Table 1. The unit of measurement for the numerical values of the components in Table 1 is mass %.

Example 1-2

A joint treatment agent was obtained in the same manner as in Example 1-1, except that a liquid polyurethane resin (trade name "NL2249E", manufactured by Mitsui Chemicals, Inc., resin fraction 30%, solvent fraction (ethyl acetate/IPA) 70%) was used, the resin component and ethanol were mixed, and methyl ethyl ketone (MEK) was then added to dissolve the resin component, thereby preparing a resin solution.

Example 1-3

A joint treatment agent was obtained in the same manner as in Example 1-1, except that a liquid vinyl acetate-alkyl acrylate resin (trade name "CEVIAN A800", manufactured by Daicel Corporation, resin fraction 45% to 50%, solvent fraction (methanol) 45% to 50%) was used, the resin component and ethanol were mixed, and methyl ethyl ketone (MEK) was then added to dissolve the resin component, thereby preparing a resin solution.

Example 1-4

A joint treatment agent was obtained in the same manner as in Example 1-1, except that a solid polyester resin (trade name "VYLON 500", manufactured by Toyobo Co., Ltd.)

was used, the resin component and ethanol were mixed, and methyl ethyl ketone (MEK) was then added to dissolve the resin component, thereby preparing a resin solution.

Example 1-5

A joint treatment agent was obtained in the same manner as in Example 1-1, except that a powdered butyral resin (trade name "S-LEC BL-1", manufactured by Sekisui Chemical Co., Ltd.) was used, the resin component and ethanol were mixed, and methyl ethyl ketone (MEK) was then added to dissolve the resin component, thereby preparing a resin solution.

component with ethanol, then adding methyl ethyl ketone (MEK) and acetone, and dissolving the vinyl chloride-vinyl acetate copolymer.

Then, a joint treatment agent was obtained by adding a pigment (manufactured by Dainichiseika Color & Chemicals Mfg. Co., Ltd.), an antibacterial and antifungal agent (product name "DENICIDE BF-1", manufactured by Nagase ChemteX Corporation), a plasticizer (diisononyl phthalate (DINP)), and a stabilizer (product name "SB-35", manufactured by Tokyo Fine Chemical Co., Ltd.) to the resulting resin solution. The ratio of each component in the

TABLE 1

| | | Example 1-1 | Example 1-2 | Example 1-3 | Example 1-4 | Example 1-5 | Comparative Example 1-1 |
|---|---|---|---|---|---|---|---|
| Resin components | Vinyl chloride - vinyl acetate | 23.3 | | | | | 23.3 |
| | Urethane | | 23.3 | | | | |
| | Vinyl acetate - alkyl acrylate | | | 23.3 | | | |
| | Polyester | | | | 23.3 | | |
| | Butyral | | | | | 23.3 | |
| Solvent components | MEK | 52.5 | 52.5 | 52.5 | 52.5 | 52.5 | |
| | Methylene chloride | | | | | | 71.1 |
| Ethanol | | 18.6 | 18.6 | 18.6 | 18.6 | 18.6 | |
| Pigment | | 0.5 | 0.5 | 0.5 | 0.5 | 0.5 | 0.5 |
| Antibacterial and antifungal agent | | 0.2 | 0.2 | 0.2 | 0.2 | 0.2 | 0.2 |
| Plasticizer | | 4.7 | 4.7 | 4.7 | 4.7 | 4.7 | 4.7 |
| Stabilizer | | 0.2 | 0.2 | 0.2 | 0.2 | 0.2 | 0.2 |
| Dissolution state (evaluation in Test Example 1-1) | | ○ | ○ | ○ | ○ | ○ | ○ |
| Presence/absence of damage to flooring material surface (evaluation in Test Example 1-2) | | ○ | ○ | ○ | ○ | ○ | x |
| Presence/absence of joint treatment agent remaining on flooring material surface (evaluation in Test Example 1-2) | | ○ | ○ | ○ | ○ | ○ | ○ |

Examples 1-6 to 1-10

A resin solution was prepared by using a powdered vinyl chloride-vinyl acetate resin (product name "SOLBIN M5R", manufactured by Nissin Chemical Industry Co., Ltd., vinyl chloride content 76.3 mass %, vinyl acetate content 23 mass %, dicarboxylic acid content 0.7 mass %, and particle size 100 μm to 120 μm) as a resin component, mixing the resin treatment agent is shown in Table 2. The unit of measurement for the numerical values of the components in Table 2 is mass %.

Examples 1-7 to 1-10

Joint treatment agents were prepared in the same manner as in Example 1-6, except that the compositions were changed as shown in Table 2.

TABLE 2

| | | Example 1-6 | Example 1-7 | Example 1-8 | Example 1-9 | Example 1-10 |
|---|---|---|---|---|---|---|
| Resin components | Vinyl chloride - vinyl acetate | 23.5 | 23.5 | 23.5 | 23.5 | 23.5 |
| Solvent components | MEK | 40.0 | 30.0 | 20.0 | 10.0 | 1.0 |
| | Acetone | 11.0 | 21.0 | 31.0 | 41.0 | 50.0 |
| | Ethanol | 18.9 | 18.9 | 18.9 | 18.9 | 18.9 |

TABLE 2-continued

|  | Example 1-6 | Example 1-7 | Example 1-8 | Example 1-9 | Example 1-10 |
|---|---|---|---|---|---|
| Pigment | 0.5 | 0.5 | 0.5 | 0.5 | 0.5 |
| Antibacterial and antifungal agent | 0.2 | 0.2 | 0.2 | 0.2 | 0.2 |
| Plasticizer | 4.7 | 4.7 | 4.7 | 4.7 | 4.7 |
| Stabilizer | 1.2 | 1.2 | 1.2 | 1.2 | 1.2 |
| Dissolution state (evaluation in Test Example 1-1) | ○ | ○ | ○ | ○ | ○ |
| Presence/absence of damage to flooring material surface (evaluation in Test Example 1-2) | ○ | ○ | ○ | ○ | ○ |
| Presence/absence of joint treatment agent remaining on flooring material surface (evaluation in Test Example 1-2) | ○ | ○ | ○ | ○ | ○ |

Comparative Example 1-1

A joint treatment agent was prepared in the same manner as in Example 1-1, except that methylene chloride was used instead of the mixed solvent of ethanol and methyl ethyl ketone.

Test Example 1-1

Solubility or solution state of the vinyl chloride-vinyl acetate copolymer, which was a resin component, was visually observed with respect to the joint treatment agents of Examples 1-1 to 1-10 and Comparative Example 1-1. The results are shown in Tables 1 and 2.

The evaluation result was "x" when the resin component could not be sufficiently dispersed and the presence of aggregates (lumps) was confirmed and "○" when the presence of the aforementioned aggregates could not be recognized. The results are shown in Tables 1 and 2. As apparent from the results in Tables 1 and 2, the presence of lumps is not confirmed for any of the joint treatment agents and it is clear that substantially the entire resin component is dissolved in the organic solvents.

Test Example 1-2

The joint treatment was implemented according to the first embodiment by using the joint treatment agents of Examples 1-1 to 1-10 and Comparative Example 1-1. Commercially available flooring materials were used as the interior sheets. The flooring materials had a protective layer (thickness 20 μm) comprising a solvent-free urethane acrylate-based ultraviolet radiation curable resin (product name "AUREX NO. 145TK", manufactured by Chugoku Marine Paints, Ltd). The size of one flooring material was 300 mm (length)×100 mm (width)×2 mm (thickness; including the thickness of the protective layer).

The longitudinal edges of the two flooring materials were abutted against each other, the joint treatment agent was injected in the butt joint portion, and an adhesive tape was attached before the joint treatment agent was cured (that is, within 5 min after the injection). After a certain time passed, the adhesive tape was slowly peeled off with fingers. In this case, visual evaluation was performed with respect to: 1) presence/absence of damage to the upper surface of the flooring materials, and 2) presence/absence of the joint treatment agent remaining on the upper surface of the flooring materials. The results are shown in Tables 1 and 2.

The evaluation of (1) above was "○" when damage (erosion) of the flooring material surface was not recognized, "Δ" when no noticeable damage to the flooring material surface was recognized but slight discoloration was present, and "x" when damage to the flooring material surface by dissolution was recognized.

The evaluation of (2) above was "○" when the joint treatment agent did not remain on the upper surface of the flooring materials, "Δ" when some joint treatment agent remained, and "x" when the entire joint treatment agent present on the upper surface of the flooring materials remained (the joint treatment agent present on the flooring material surface practically could not be removed with the adhesive tape).

Example 2-1

A resin solution was prepared by using a powdered vinyl chloride-vinyl acetate resin (product name "SOLBIN M5R", manufactured by Nissin Chemical Industry Co., Ltd., vinyl chloride content 76.3 mass %, vinyl acetate content 23 mass %, dicarboxylic acid content 0.7 mass %, and particle size 100 μm to 120 μm) as a resin component, mixing the resin component with ethanol, adding methyl ethyl ketone (MEK), and dissolving the vinyl chloride-vinyl acetate copolymer. Then, a joint treatment agent was obtained by adding a pigment (manufactured by Dainichiseika Color & Chemicals Mfg. Co., Ltd.) and an antibacterial and antifungal agent (product name "DENICIDE BF-1", manufactured by Nagase ChemteX Corporation) to the resulting resin solution. The ratio of components in the treatment agent is shown in Table 3. The unit of measurement for the numerical values of the components in Table 3 is mass %.

TABLE 3

|  | Example 2-1 | Example 2-2 | Example 2-3 | Example 2-4 | Comparative Example 2-1 |
|---|---|---|---|---|---|
| Resin components | 23.6 | 27.5 | 24.8 | 23.6 | 31.0 |
| Ethanol | 18.9 | 11.0 | 19.8 | 23.6 | 0 |

TABLE 3-continued

|  | Example 2-1 | Example 2-2 | Example 2-3 | Example 2-4 | Comparative Example 2-1 |
| --- | --- | --- | --- | --- | --- |
| MEK | 56.6 | 60.6 | 54.5 | 51.9 | 68.1 |
| Pigment | 0.7 | 0.7 | 0.7 | 0.7 | 0.7 |
| Antibacterial and antifungal agent | 0.2 | 0.2 | 0.2 | 0.2 | 0.2 |
| Dissolution state | ○ | ○ | ○ | ○ | x |

Examples 2-2 to 2-4

Joint treatment agents were prepared in the same manner as in Example 2-1, except that the compounding ratios of components were changed as shown in Table 3.

Comparative Example 2-1

A joint treatment agent was prepared in the same manner as in Example 2-1, except that ethanol was not used.

Test Example 2-1

Solubility or solution state of the vinyl chloride-vinyl acetate copolymer, which was a resin component, was visually observed with respect to the joint treatment agents of Examples 2-1 to 2-4 and Comparative Example 2-1. The evaluation result was "x" when the resin component could not be sufficiently dispersed and the presence of aggregates (lumps) was confirmed and "○" when the presence of the aforementioned aggregates was not recognized. The results are shown in Table 3.

As apparent from the results in Table 3, in Comparative Example 2-1 in which ethanol was not used, lumps were generated, whereas in the joint treatment agents of Examples 2-1 to 2-4, no lumps were confirmed and practically the entire resin component dissolved in the organic solvents.

Comparative Example 2-2

The joint treatment agent was prepared in the same manner as in Example 2-1, except that THF was used instead of the mixed solvent of ethanol and methyl ethyl ketone.

Test Example 2-2

The surface state in the case of coating the joint treatment agents of Example 2-1 and Comparative Example 2-2 on a vinyl chloride-based resin was observed. The test method was implemented by the procedure including dropping 2 g of the joint treatment agent on the sheet surface composed of a vinyl chloride-based resin, covering with a watch glass and allowing the sheet surface to stand for 30 min, and then visually confirming the state of the sheet surface. The evaluation based on visual observation of the surface of the vinyl chloride-based resin was performed in the following manner: "○" when damage (erosion) to the surface of the vinyl chloride-based resin caused by dissolution was not recognized, and "x" when damage (erosion) to the surface of the vinyl chloride-based resin caused by dissolution was recognized. The results are shown in Table 4.

TABLE 4

|  | Example 2-1 | Comparative example 2-2 |
| --- | --- | --- |
| Surface state | ○ | x |

As apparent from the results in Table 4, in Comparative Example 2-2 in which THF was used as an organic solvent, the surface of the vinyl chloride-based resin was damaged by strong dissolution, whereas no such damage occurred with the joint treatment agent of Example 2-1.

Example 2-5

A joint treatment agent was prepared in the same manner as in Example 2-1, except that a vinyl chloride-vinyl acetate resin (product name "SOLBIN M5R", manufactured by Nissin Chemical Industry Co., Ltd., vinyl chloride content 86.0 mass %, vinyl acetate content 13.4 mass %, dicarboxylic acid content 0.6 mass %) as a resin component was used.

Test Example 2-3

Flooring material sheets from a vinyl chloride-based resin were joined using the joint treatment agents of Examples 2-1 and 2-5, and the breaking strength thereof was measured. The sample for measuring the breaking strength was obtained by the joint treatment of the flooring material sheets made from vinyl chloride based resin, allowing the joint to stand for 7 days and cutting (width 25 cm) in the direction of 90 degrees to the joint direction. The breaking strength was measured by pulling in the direction of 90 degrees to the joint direction. The results are shown in Table 5.

TABLE 5

|  | Example 2-1 | Example 2-5 |
| --- | --- | --- |
| Binding strength (N/25 mm) | 133 | 92 |

As apparent from the results in Table 5, a higher breaking strength can be realized with a higher content of vinyl acetate (Example 2-1) in the vinyl chloride-vinyl acetate copolymer which is a resin component of the joint treatment agent. Thus, high breaking strength can be obtained by setting a vinyl acetate content of 20 mass % to 25 mass % in the vinyl chloride-vinyl acetate copolymer.

Examples 2-6 to 2-16

The joint treatment agents of the compositions shown in Table 6 were prepared according to the procedure of Example 2-1. The viscosity (at 23° C.) of the resulting joint treatment agents was measured. The results are shown in Table 6. The unit of measurement for the numerical values of the components in Table 6 is mass %.

TABLE 6

| | Example 2-6 | Example 2-7 | Example 2-8 | Example 2-9 | Example 2-10 | Example 2-11 | Example 2-12 | Example 2-13 | Example 2-14 | Example 2-15 | Example 2-16 |
|---|---|---|---|---|---|---|---|---|---|---|---|
| Resin component | 20.4 | 22.2 | 25.0 | 26.3 | 27.0 | 27.8 | 30.3 | 31.2 | 32.3 | 33.3 | 44.2 |
| Ethanol | 8.2 | 8.9 | 10.0 | 10.5 | 10.8 | 11.1 | 12.1 | 12.5 | 12.9 | 13.3 | 19.3 |
| MEK | 71.4 | 68.9 | 65.0 | 63.2 | 62.2 | 61.1 | 57.6 | 56.3 | 54.8 | 53.4 | 36.5 |
| Viscosity (mPas) | 55 | 100 | 165 | 225 | 275 | 325 | 440 | 600 | 800 | 1060 | 10000 |
| Ability to fill a flooring material gap of 0.0 mm | ○ | ○ | ○ | ○ | ○ | ○ | ○ | ○ | ○ | ○ | Δ |
| Ability to fill a flooring material gap of 0.2 mm | Δ | ○ | ○ | ○ | ○ | ○ | ○ | ○ | ○ | ○ | ○ |

Test Example 2-4

Joint treatment was implemented using joint treatment agents of Examples 2-6 to 2-16. The longitudinal edges of two commercially available vinyl chloride flooring materials (300 mm (length)×100 mm (width)×2 mm (thickness)) were abutted against each other so as to obtain gaps of 0.0 mm and 0.2 mm, the joint treatment agent was injected in the butt joint portion, and the ability to fill a gap (state of the gap) after drying and curing was visually observed. The evaluation was performed in the following manner: "○" when the gap was sufficiently filled, "Δ" when the gap was generally sufficiently filled, and "x" when the presence of the gap was still confirmed. The results are shown in Table 6.

As apparent from the results in Table 6, with the joint treatment agents of Examples 2-6 to 2-16 relating to the treatment agents of the present invention, the prescribed viscosity can be maintained. As a result, the butt joint portion of the flooring materials can be filled without a gap.

Example 3-1

The nozzle member 310 for a joint treatment agent which is shown in FIG. 17(a) and FIG. 17(b) was fabricated. As shown in the cross-sectional view in FIG. 17(a), the nozzle member was configured of the needle component 31, the nozzle body component 32, and the nozzle tip component 33. The needle component 31 was made from stainless steel, and the nozzle body component 32 and the nozzle tip component 33 were both made from brass.

Figure 18:
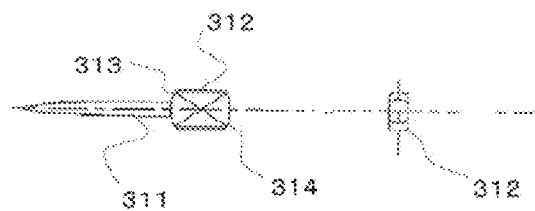
FIG. 18(a) and FIG. 18(b) show the needle component of the nozzle member fabricated in Example 3-1, where

As shown in FIG. 18(a), the needle component 31 is configured of the needle-shaped body 311 and the support portion 312. The length of the needle-shaped body 311 is about 15 mm. The tapered portion 313 with a cross-sectional area decreasing gradually toward the distal end of the needle-shaped body 311 is formed by chamfering part of the distal end side of the support portion 312. Likewise, the tapered portion 314 with a cross-sectional area decreasing gradually toward the proximal end of the needle-shaped body 311 is formed by chamfering the proximal end side part of the support portion 312. Further, as shown in FIG. 18(b), the cross-sectional shape of the support portion 312 is processed into a plate-shaped body with a thickness of about 2 mm.

The flow channel A passing through in the longitudinal direction is formed in the nozzle body component 32, as shown in the cross-sectional view in FIG. 19(a). The region A1 having an inner diameter larger than the longest diameter (about 4 mm) of the support portion 312 is formed at the tip thereof. The flow channel A on the proximal end side with respect to the region A1 has an inner diameter less than the inner diameter of the region A1. The step portion therebetween serves as the stopper portion A2. The threaded portion A3 is formed on the outer circumferential surface of the region A1.

The nozzle tip component 33 has the external appearance such as shown in FIG. 20(b). Further, as shown in the cross-sectional view in FIG. 20(a), the flow channel B is formed that passes through in the longitudinal direction. Part of the flow channel B on the terminal end side thereof serves as the region B1 having an inner diameter larger than the outer diameter of the distal end of the nozzle body component 32. The inner diameter is less on the distal end side with respect to the region B1, and the bump formed thereby is the stopper portion B2. Further, as shown in FIG. 20(a), a flow channel B' with even smaller inner diameter is formed in the flow channel B on the distal end side with respect to the region B1. This flow channel B' may be formed as necessary. Further, the threaded portion B3 is formed on the outer circumference of the region B1 and uses for screwing together with the threaded portion A3.

Figure 26:
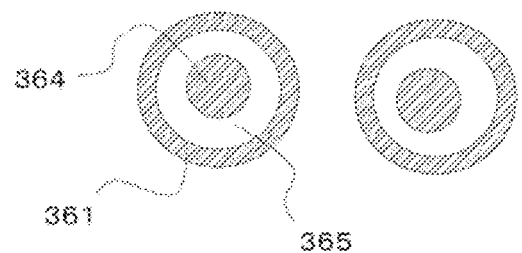
FIG. 26(a) and FIG. 26(b) are cross-sectional views illustrating the mutual arrangement of the needle component and flow channels.

The assembling of the components of the nozzle member 310 for joint treatment was completed by the procedure such as shown in FIG. 16. In this case, the connection was easily completed with fingers. It was confirmed that in the nozzle member 310 for joint treatment which was assembled in such a manner, the central axis of the needle-shaped body 311 was fixed to be positioned substantially in the center of the circular opening 331 of the nozzle tip component 33, for example, in the same manner as in FIG. 26(a). Further, when the nozzle member 310 was disassembled, it was also easily separated with fingers into constituent components.

Since the support portion 312 in the nozzle member 310 has a plate-like cross-section, the discharge amount can be controlled to a relatively large value. Therefore, the nozzle member is particularly suitable for high-viscosity joint treatment agents.

Example 3-2

Figure 25:
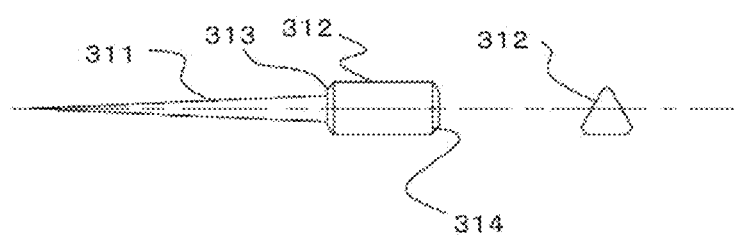
FIG. 25(a) and FIG. 25(b) show the needle component of the nozzle member fabricated in Example 3-2, where

The nozzle member 310 for joint treatment was fabricated in the same manner as in Example 3-1, except that the needle component 31 such as shown in FIG. 25(a) and FIG. 25(b) was used.

As shown in FIG. 25(a), the needle component 31 consists of the needle-shaped body 311 and the support portion 312. The length of the needle-shaped body 311 was about 15 mm. The tapered portion 313 with a cross-sectional area decreasing gradually toward the distal end of the needle-shaped body 311 is formed by chamfering part of the distal end side of the support portion 312. Likewise, the tapered portion 314 with a cross-sectional area decreasing gradually toward the proximal end of the needle-shaped body is formed by chamfering the proximal end side part of the support portion 312. Further, as shown in FIG. 25(b), the cross-sectional shape of the support portion 312 was processed into a substantially regular triangular shape with vertices chamfered into a circular arc shape.

The assembling of the components of the nozzle member 310 for joint treatment was completed by the procedure such as shown in FIG. 16. The connection was easily completed with fingers. It was confirmed that in the nozzle member 310 for joint treatment which was assembled in such a manner, the central axis of the needle-shaped body 311 was fixed to be positioned substantially in the center of the circular opening 331 of the nozzle tip component 33, for example, in the same manner as in FIG. 26(a). Further, when the nozzle member 310 was disassembled, it was also easily separated with fingers into constituent components.

Further, since the nozzle member 310 differs from that in Example 3-1 in the cross-sectional shape of the support portion 312 and the cross-sectional area thereof is increased, the discharge amount of the joint treatment agent having a low viscosity can be effectively controlled.

Example 4-1

(1) Preparation of Joint Treatment Agent

In Example 4-1, a resin solution was prepared by using a powdered vinyl chloride-vinyl acetate resin (product name "SOLBIN M5R", manufactured by Nissin Chemical Industry Co., Ltd., vinyl chloride content 76.3 mass %, vinyl acetate content 23 mass %, dicarboxylic acid content 0.7 mass %, and particle size 100 μm to 120 μm) as a resin component, mixing the resin component with modified ethanol (mixed liquid including 85 vol % of ethanol, 10 vol % of normal propyl alcohol, and 5 vol % of isopropyl alcohol), then adding methyl ethyl ketone (MEK), and dissolving the vinyl chloride-vinyl acetate copolymer.

Then, a joint treatment agent was obtained by adding a pigment (manufactured by Dainichiseika Color & Chemicals Mfg. Co., Ltd.), an antibacterial and antifungal agent (product name "DENICIDE BF-1", manufactured by Nagase ChemteX Corporation), a plasticizer (diisononyl phthalate (DINP)), and a stabilizer (product name "SB-35", manufactured by Tokyo Fine Chemical Co., Ltd.) to the resulting resin solution. The ratio of components in the treatment agent is shown in Table 7. The unit of measurement for the numerical values of the components in Table 7 is mass %.

(2) Implementation of Joint Treatment

The joint treatment was performed according to the first embodiment by using the joint treatment agents prepared in (1) hereinabove. Commercially available flooring materials (product name "MATURE NW FS2009", manufactured by Toli Corporation) were used as the interior sheets. The flooring materials had a protective layer (thickness 20 μm) comprising a solvent-free urethane acrylate-based ultraviolet radiation curable resin (product name "AUREX NO. 145TK", manufactured by Chugoku Marine Paints Ltd). The size of one flooring material was 300 mm (length)×100 mm (width)×2 mm (thickness; including the thickness of the protective layer).

The longitudinal edges of the two flooring materials were abutted against each other, the joint treatment agent was injected in the butt joint portion, and an adhesive tape was attached before the joint treatment agent was cured (that is, within 5 min after the injection). Then, the roller portion of the pressing instrument such as shown in FIG. 8 was reciprocated, while rolling, a plurality of times so as to bring the adhesive tape into close contact with the underlayment. In the roller portion of the pressing instrument in the present example, the core is made from stainless steel (width about 40 mm), and a commercially available ethylene-propylene rubber sponge (width 30 mm, thickness 2 mm, hardness 15) is wound on and fixed to the outer circumference of the core so as to obtain a single layer with a commercially available two-side adhesive tape.

After a certain time has passed, the adhesive tape was slowly peeled off with fingers. In this case, visual evaluation was performed with respect to: 1) presence/absence of damage to the upper surface of the flooring materials, and 2) presence/absence of the joint treatment agent remaining on the upper surface of the flooring materials. The results are shown in Table 7.

The evaluation of 1) above was "○" when damage (erosion) of the flooring material surface was not recognized, "Δ" when no noticeable damage to the upper surface of the flooring materials was found, but slight discoloration was present, and "x" when damage to the upper surface of the flooring materials by dissolution was recognized.

The evaluation of 2) above was "○" when the joint treatment agent did not remain on the flooring material surface, "Δ" when the joint treatment agent generally did not remain, but slight amount thereof remained in the embossed depressions on the flooring material surface, and "x" when the joint treatment agent remained, and a particularly large amount thereof remained in the embossed depressions on the flooring material surface.

In the above-described evaluation, the external appearance of the flooring material surface was photographed after the adhesive tape was peeled off. The result is shown in FIG. 10(a) and FIG. 10(b).

Comparative Example 4-1

The construction was implemented in the same manner as in Example 4-1, except that a commercially available press-affixing roller (the roller was made from stainless steel) was used as the pressing member in Example 4-1, and the testing and evaluation were performed in the same manner as in Example 4-1(2). The external appearance was also photographed in the same manner as in Example 4-1(2). The results are shown in Table 7 and FIG. 10(a) and FIG. 10(b).

TABLE 7

| | | Example 4-1 | Comparative Example 4-1 |
|---|---|---|---|
| Resin component | Vinyl chloride - vinyl acetate copolymer | 23.3 | 23.3 |
| Solvent component | MEK | 52.5 | 52.5 |
| Modified ethanol | | 18.6 | 18.6 |
| Pigment | | 0.5 | 0.5 |
| Antimicrobial and antifungal agent | | 0.2 | 0.2 |
| Plasticizer | | 4.7 | 4.7 |

TABLE 7-continued

| | Example 4-1 | Comparative Example 4-1 |
|---|---|---|
| Stabilizer | 0.2 | 0.2 |
| Presence/absence of damage to flooring material surface | ○ | ○ |
| Presence/absence of joint treatment agent remaining on flooring material surface | ○ | x |

As apparent from the results in Table 7, when the construction was performed using the instrument of the present invention, the cured joint treatment agent was effectively removed. This is also clear from FIG. 10(*a*) and FIG. 10(*b*) where the external appearances in Example 4-1 and Comparative Example 4-1 are compared. It is clear that in FIG. 10(*a*) which shows the results obtained in Comparative Example 4-1, portions where the joint treatment agent partially remained in the depressions were confirmed, whereas in FIG. 10(*b*) which shows the results obtained in Example 4-1 such portions was not recognized.

What is claimed is:

1. A method for sealing a butt joint portion between interior sheets which have a protective layer comprising an ionizing radiation curable resin, the protective layer being formed as a surface layer of each of the interior sheets, the method comprising:
    (1) a step of injecting a joint treatment agent which has substantially no dissolving ability with respect to at least the protective layer into the butt joint portion; and
    (2) a step of attaching, before the injected joint treatment agent is cured, an adhesive tape so as to being in contact with the protective layer and the joint treatment agent present in the butt joint portion with straddling across the butt joint portion.

2. The method according to claim 1, further comprising a step of pressing the adhesive tape from above simultaneously with the attachment of the adhesive tape and/or after the attachment thereof.

3. The method according to claim 2, further comprising a step of peeling off the adhesive tape after the injected joint treatment agent has been cured.

4. The method according to claim 2, wherein the adhesive tape is a laminate comprising a base material layer and an adhesive layer formed on either outermost surface of the base material layer, the base material layer being composed of a porous fibrous material.

5. The method according to claim 1, wherein
    (1) the joint treatment agent is a liquid composition comprising a vinyl chloride-based resin and an organic solvent;
    (2) the vinyl chloride-based resin is dissolved in the organic solvent; and
    (3) the organic solvent contains a ketone-type solvent and an alcohol-type solvent.

6. The method according to claim 1, wherein the injection of the joint treatment agent into the butt joint portion is carried out using a nozzle member;
    (1) the nozzle member comprises a needle component, a nozzle body component and a nozzle tip component, which are detachably connected to each other;
    (2) the needle component is disposed at a distal end of the nozzle member and has a needle-shaped body and a support portion for fixing the needle-shaped body;
    (3) the nozzle body component has
    (3a) a flow channel A passing through in a longitudinal direction thereof;
    (3b) in the flow channel A, a region A1 where the support portion can be fixed at least in a direction perpendicular to the longitudinal direction by inserting the entire support portion or part thereof into the flow channel A; and
    (3c) a connection portion A3 for connecting to the nozzle tip component;
    (4) the nozzle tip component has
    (4a) a flow channel B passing through in a longitudinal direction thereof and
    (4b) a connection portion B3 for connecting to the nozzle body component; and
    (5) the connection portion A3 and the connection portion B3 are connected such that the flow channel A and the flow channel B form a single flow channel, while the needle-shaped body passes through the flow channel B of the nozzle tip component and protrudes from an opening on a distal end side of the nozzle tip component, and the opening and the needle-shaped body have a gap therebetween in a cross-sectional direction.

7. The method according to claim 2, wherein in the step of pressing, the uncured joint treatment agent is pressed through the adhesive tape using a pressing instrument, the pressing instrument comprising
    (1) (a) a gripping portion; (b) a support portion connected to the gripping portion; and (c) a rotatable roller component mounted on the support portion,
    (2) the roller component comprising a core composed of a hard material and an elastic layer laminated adjacently to an outer circumference of the core, and the elastic layer being disposed as an outermost layer of the roller component.

8. The method according to claim 3, wherein the adhesive tape is a laminate comprising a base material layer and an adhesive layer formed on either outermost surface of the base material layer, the base material layer being composed of a porous fibrous material.

* * * * *